US012670561B2

(12) United States Patent
Lei et al.

(10) Patent No.: US 12,670,561 B2
(45) Date of Patent: Jun. 30, 2026

(54) APPARATUS AND METHODS TO GENERATE DEBLURRING MODEL AND DEBLUR IMAGE

(71) Applicant: ASML Netherlands B.V., Veldhoven (NL)

(72) Inventors: Hairong Lei, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 421 days.

(21) Appl. No.: 18/031,601

(22) PCT Filed: Sep. 27, 2021

(86) PCT No.: PCT/EP2021/076446
§ 371 (c)(1),
(2) Date: Apr. 12, 2023

(87) PCT Pub. No.: WO2022/078740
PCT Pub. Date: Apr. 21, 2022

(65) Prior Publication Data
US 2024/0005457 A1 Jan. 4, 2024

Related U.S. Application Data

(60) Provisional application No. 63/091,126, filed on Oct. 13, 2020.

(51) Int. Cl.
G06T 5/73 (2024.01)
G06T 5/70 (2024.01)
G06T 7/13 (2017.01)

(52) U.S. Cl.
CPC .................. G06T 5/73 (2024.01); G06T 5/70 (2024.01); G06T 7/13 (2017.01);
(Continued)

(58) Field of Classification Search
CPC .... G06T 5/73; G06T 5/70; G06T 7/13; G06T 2207/10061; G06T 2207/20081;
(Continued)

(56) References Cited

U.S. PATENT DOCUMENTS

| | | | |
|---|---|---|---|
| 5,229,872 A | 7/1993 | Mumola | |
| 6,046,792 A | 4/2000 | Van Der Werf et al. | |

(Continued)

FOREIGN PATENT DOCUMENTS

| | | |
|---|---|---|
| JP | H08329875 A | 12/1996 |
| JP | 2005285898 A | 10/2005 |

(Continued)

OTHER PUBLICATIONS

Suk, Ji Won, et al. "Transfer of CVD-grown monolayer graphene onto arbitrary substrates." ACS nano 5.9 (2011): 6916-6924.*

(Continued)

*Primary Examiner* — Shefali D Goradia
(74) *Attorney, Agent, or Firm* — FINNEGAN, HENDERSON, FARABOW, GARRETT & DUNNER, LLP

(57) ABSTRACT

Described herein is a method, and system for training a deblurring model and deblurring an image (e.g., SEM image) of a patterned substrate using the deblurring model and depth data associated with multiple layers of the patterned substrate. The method includes obtaining, via a simulator using a target pattern as input, a simulated image of the substrate, the target pattern comprising a first target feature to be formed on a first layer, and a second target feature to be formed on a second layer located below the first layer; determining, based on depth data associated with multiple layers of the substrate, edge range data for features of the substrate; and adjusting, using the simulated image and the edge range data associated with the target pattern as
(Continued)

training data, parameters of a base model to generate the deblurring model to a deblur image of a captured image.

20 Claims, 20 Drawing Sheets

(52) U.S. Cl.
CPC ............... *G06T 2207/10061* (2013.01); *G06T 2207/20081* (2013.01); *G06T 2207/20084* (2013.01); *G06T 2207/20192* (2013.01); *G06T 2207/30148* (2013.01)

(58) Field of Classification Search
CPC . G06T 2207/20084; G06T 2207/20192; G06T 2207/30148; G06T 5/60; G06T 2207/30141; G06T 5/50; G06T 2207/30108; G01N 21/9501; G01N 21/9503; G01N 21/9505; G01N 2223/6116; G03F 7/7065
See application file for complete search history.

(56) References Cited

U.S. PATENT DOCUMENTS

| | | | | |
|---|---|---|---|---|
| 9,712,806 | B2 * | 7/2017 | Olmstead | ............. H04N 13/239 |
| 10,529,534 | B2 | 1/2020 | Pathangi Sriraman | |
| 12,062,164 | B2 * | 8/2024 | Kang | ....................... G06T 7/13 |
| 12,062,166 | B2 * | 8/2024 | Chen | ..................... G06T 7/0002 |
| 2008/0301620 | A1 | 12/2008 | Ye et al. | |
| 2009/0157360 | A1 | 6/2009 | Ye et al. | |
| 2017/0191945 | A1 * | 7/2017 | Zhang | ..................... G06T 7/001 |
| 2019/0214223 | A1 | 7/2019 | Pathangi Sriraman | |
| 2020/0018944 | A1 | 1/2020 | Fang et al. | |
| 2020/0258212 | A1 | 8/2020 | Neumann et al. | |
| 2021/0073959 | A1 * | 3/2021 | Elmalem | .................. G06T 7/50 |
| 2022/0270901 | A1 * | 8/2022 | Sadeghi | ................. G06V 10/56 |
| 2023/0054464 | A1 * | 2/2023 | Liu | .......................... H01L 22/12 |

FOREIGN PATENT DOCUMENTS

| | | | | |
|---|---|---|---|---|
| JP | 2011119446 | A | 6/2011 | |
| JP | 7002949 | B2 | 1/2022 | |
| JP | 2023526176 | A | 6/2023 | |
| TW | 201828335 | A | 8/2018 | |
| TW | 201939564 | A | 10/2019 | |
| TW | 202016970 | A | 5/2020 | |
| WO | WO-2022052595 | A1 * | 3/2022 | ............. H01L 22/12 |

OTHER PUBLICATIONS

Houben, Tim, et al. "Depth estimation from a single CD-SEM image using domain adaptation with multimodal data." Fourteenth International Conference on Machine Vision (ICMV 2021). vol. 12084. SPIE, 2022. (Year: 2022).*
International Search Report issued in related PCT Application No. PCT/EP2021/076446; mailed Jan. 26, 2022 (2 pgs.).
Office Action of the Intellectual Property Office of Taiwan issued in related Taiwanese U.S. Appl. No. 11/037,665; mailed Sep. 12, 2022 (7 pgs.).

* cited by examiner

400

600

APPARATUS AND METHODS TO GENERATE DEBLURRING MODEL AND DEBLUR IMAGE

CROSS-REFERENCE TO RELATED APPLICATIONS

This application claims priority to International Application No. PCT/EP2021/076446, filed Sep. 27, 2021, and published as WO 2022/078740 A1, which claims priority of U.S. application 63/091,126 which was filed on Oct. 13, 2020. The contents of these applications are incorporated herein by reference in their entireties.

TECHNICAL FIELD

The description herein relates generally to processing images acquired by an inspection or metrology tool, and more particularly, related to image deblurring by using machine learning.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

SUMMARY

According to an embodiment, there is provided a method for training an image deblurring model for processing images. The method includes obtaining, via a simulator using a target pattern from which a pattern on a substrate is derived, a simulated image of the substrate corresponding to the target pattern. The target pattern comprising a first target feature to be formed on a first layer on the substrate, and a second target feature to be formed on a second layer on the substrate, the second layer being located below the first layer on the substrate. The method further includes determining, based on depth data associated with multiple layers of the substrate, edge range data for features on the substrate corresponding to the first and second target features of the target pattern. The depth data characterizes blurring of edges of the features on the substrate as a function of a depth of the respective feature from a top layer of the substrate. The method further includes adjusting, using the simulated image and the edge range data of the substrate as training data, parameters of a base model to generate the deblurring model. The deblurring model is configured to generate a deblur image of the captured image of the patterned substrate using edge range data associated with the captured image.

In an embodiment, there is provided a method of deblurring a captured image of a pattered substrate. The method includes identifying features in the captured image based on a target pattern and depth data associated with each layer of the patterned substrate; and deblurring the captured image by deblurring each of the features based on the target pattern and the depth data.

In an embodiment, there is provided a method of deblurring a captured image of a patterned substrate. The method includes inputting a captured image of the patterned substrate and edge range data associated with a target pattern to a deblurring model.

In an embodiment, there is provided, a system including e-beam optics configured capture an image of a patterned substrate; and one or more processors configured to deblur the captured image. The one or more processor configured to input the captured image of the patterned substrate and edge range data associated with the target pattern to a deblurring model, wherein the deblurring model is trained based on edge range data associated with features of the target pattern at certain depth; and deblur the captured image by executing the deblurring model.

In an embodiment, there is provided, one or more non-transitory computer-readable media comprising instructions corresponding to processes of the methods herein. In an embodiment, one or more non-transitory computer-readable media is for storing a deblurring model. In an embodiment, one or more non-transitory computer-readable media is configured to generate a deblurred image via the stored deblurring model. In particular, one or more non-transitory computer-readable media stores instructions that, when executed by one or more processors, provides the deblurring model. In an embodiment, the deblurring model is produced by processes of the method herein. For example, the processes of generating the deblurring model includes obtaining, via a simulator using a target pattern from which a pattern on a substrate is derived, a simulated image of the substrate corresponding to the target pattern; determining, based on depth data associated with multiple layers of the substrate, edge range data for features on the substrate corresponding to the first and second target features of the target pattern; and adjusting, using the simulated image and the edge range data of the substrate as training data, parameters of a base model to generate the deblurring model. The deblurring model is configured to generate a deblur image of the captured image of the patterned substrate using edge range data associated with the captured image.

According to embodiments of the present disclosure, a deblurring model is trained by using simulated images that are converted from design patterns through a simulator (e.g., Monte-Carlo based simulator), and depth data associated with the design patterns. Training data comprising the simulated images and the depth data can collectively cover remarkably and sufficiently more patterns than SEM-captured images. The improved pattern coverage can advantageously result in significantly improved effectiveness and accuracy of the deblurring model. The requirement for retraining can be far reduced or even eliminated.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

4

Figure 3:
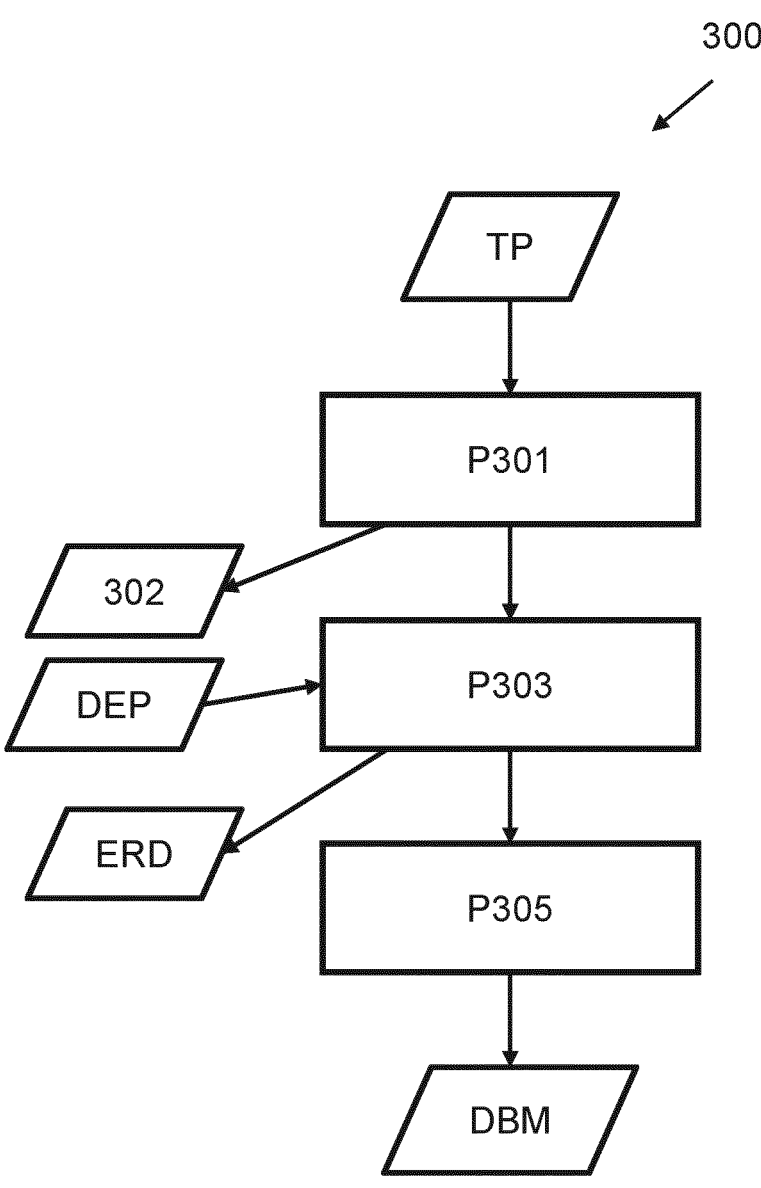
FIG. 3 is a flow chart of a method for training a deblurring model, according to an embodiment.
Figure 5:
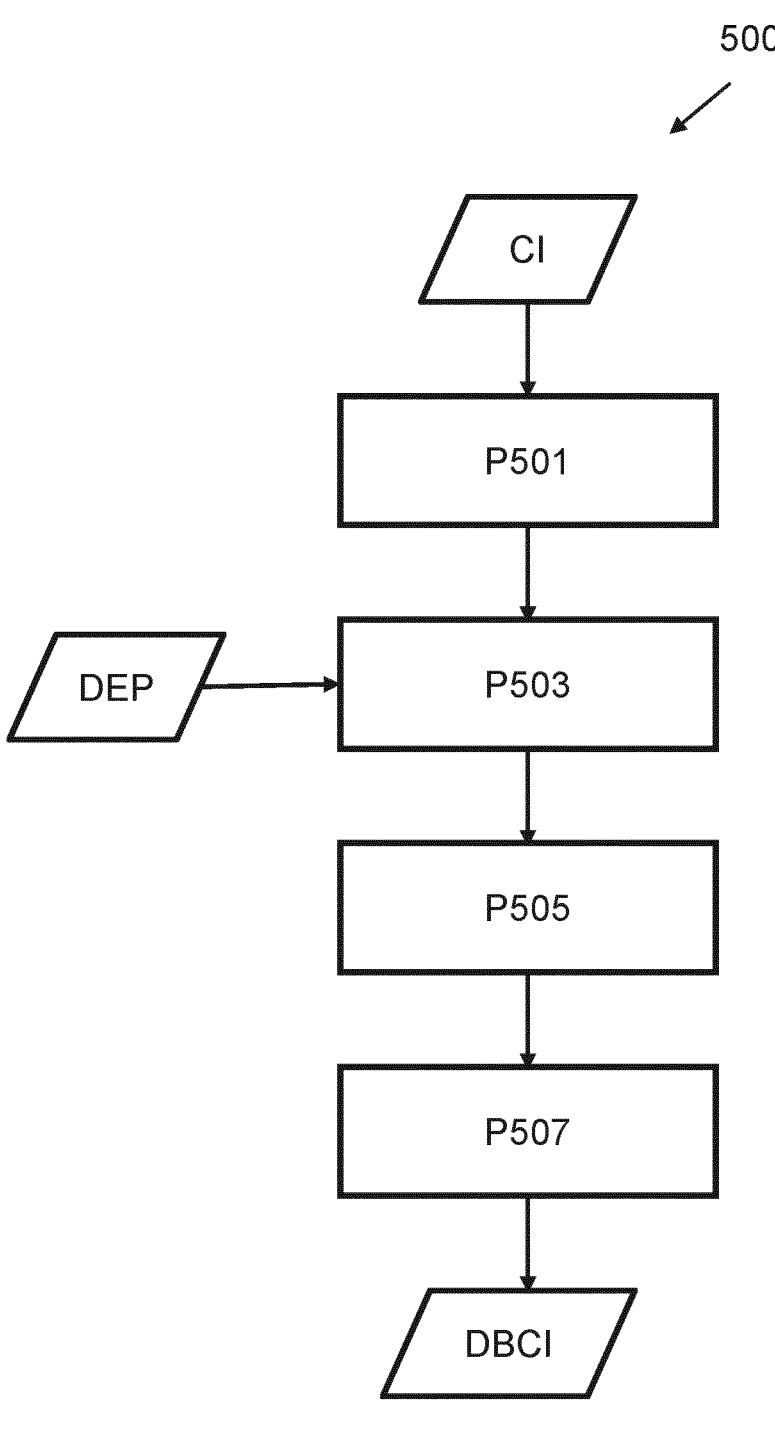
Figure 6:
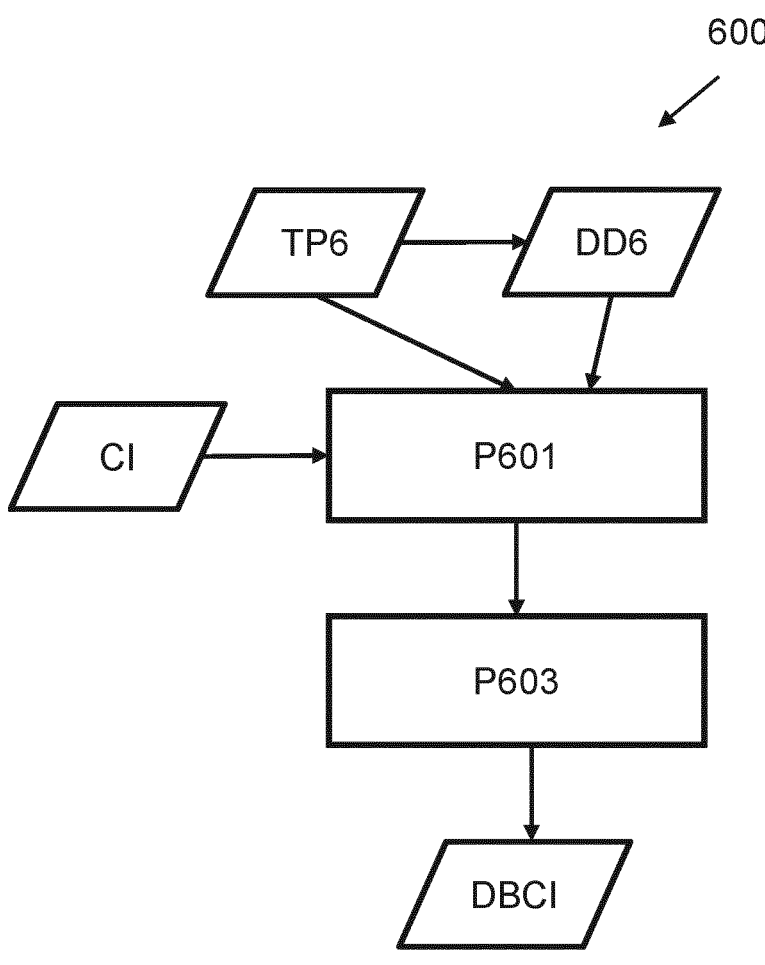
Figure 7:
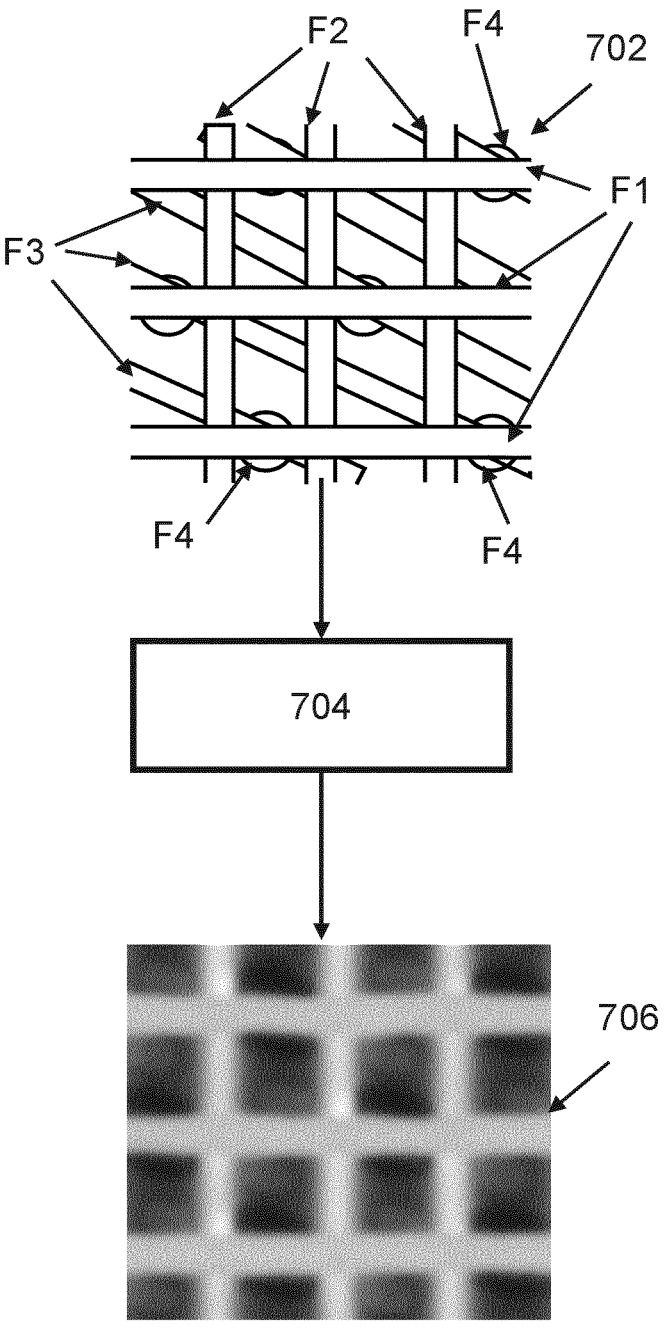
Figures 8A, 8B:
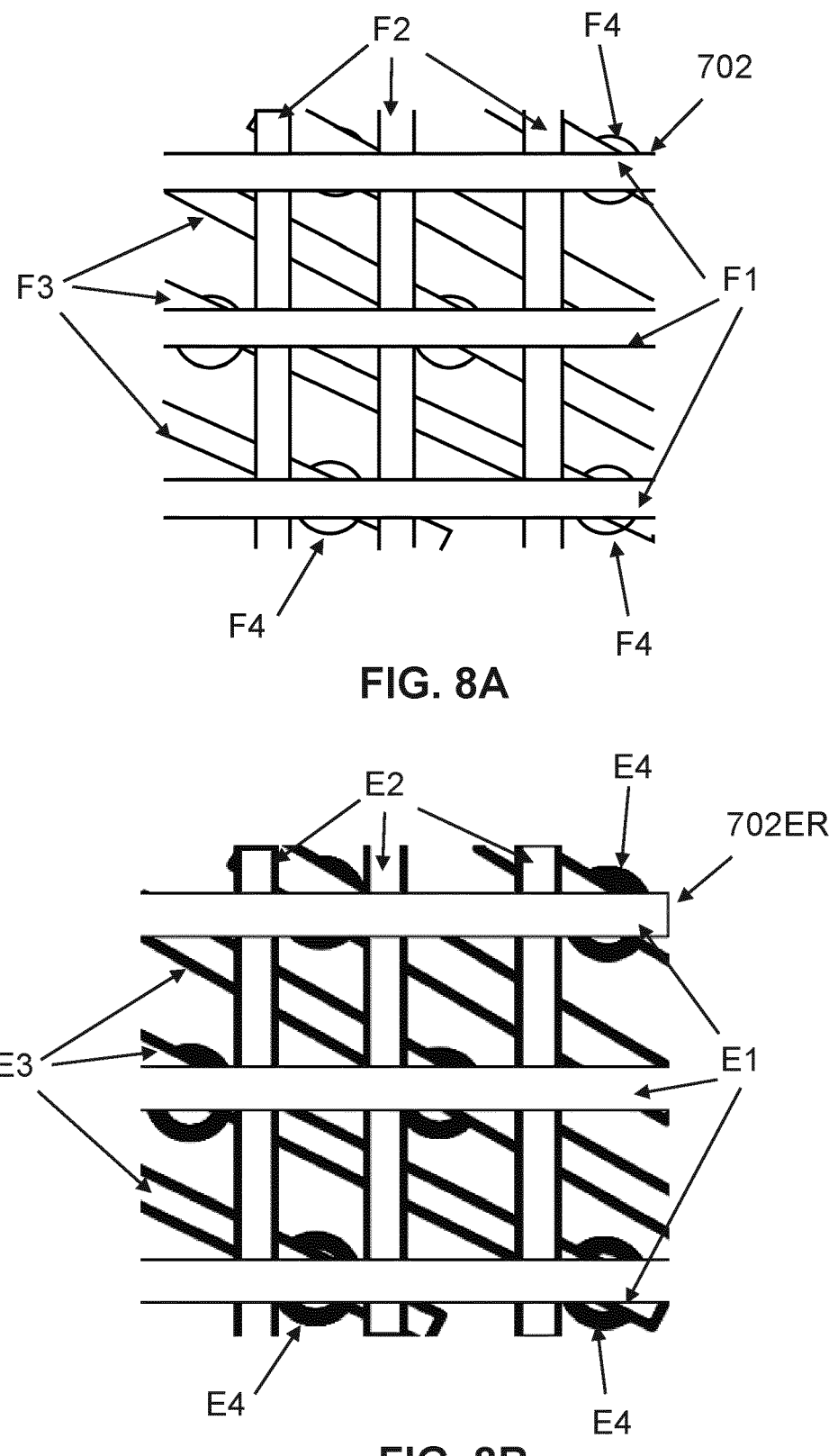
Figure 9:
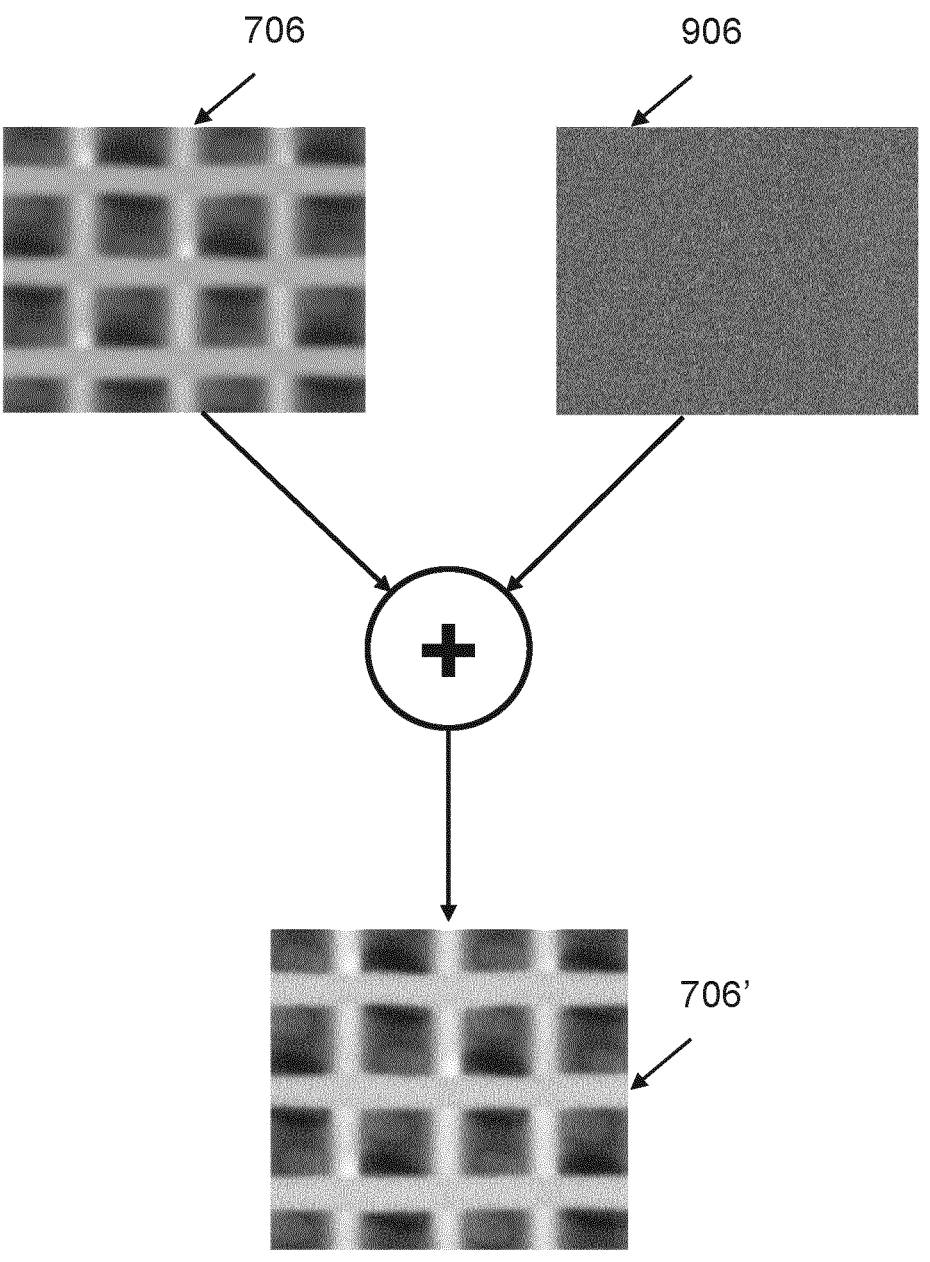
Figure 10:
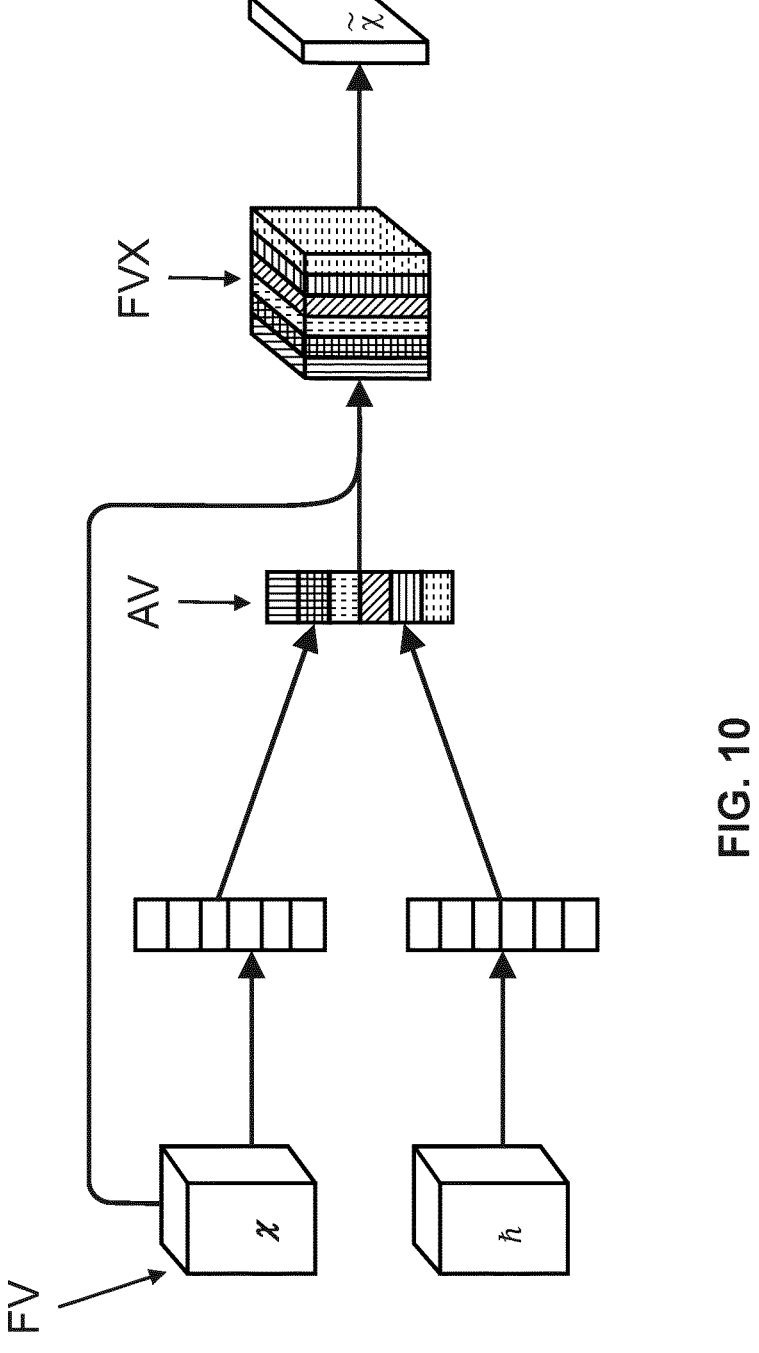
Figure 11:
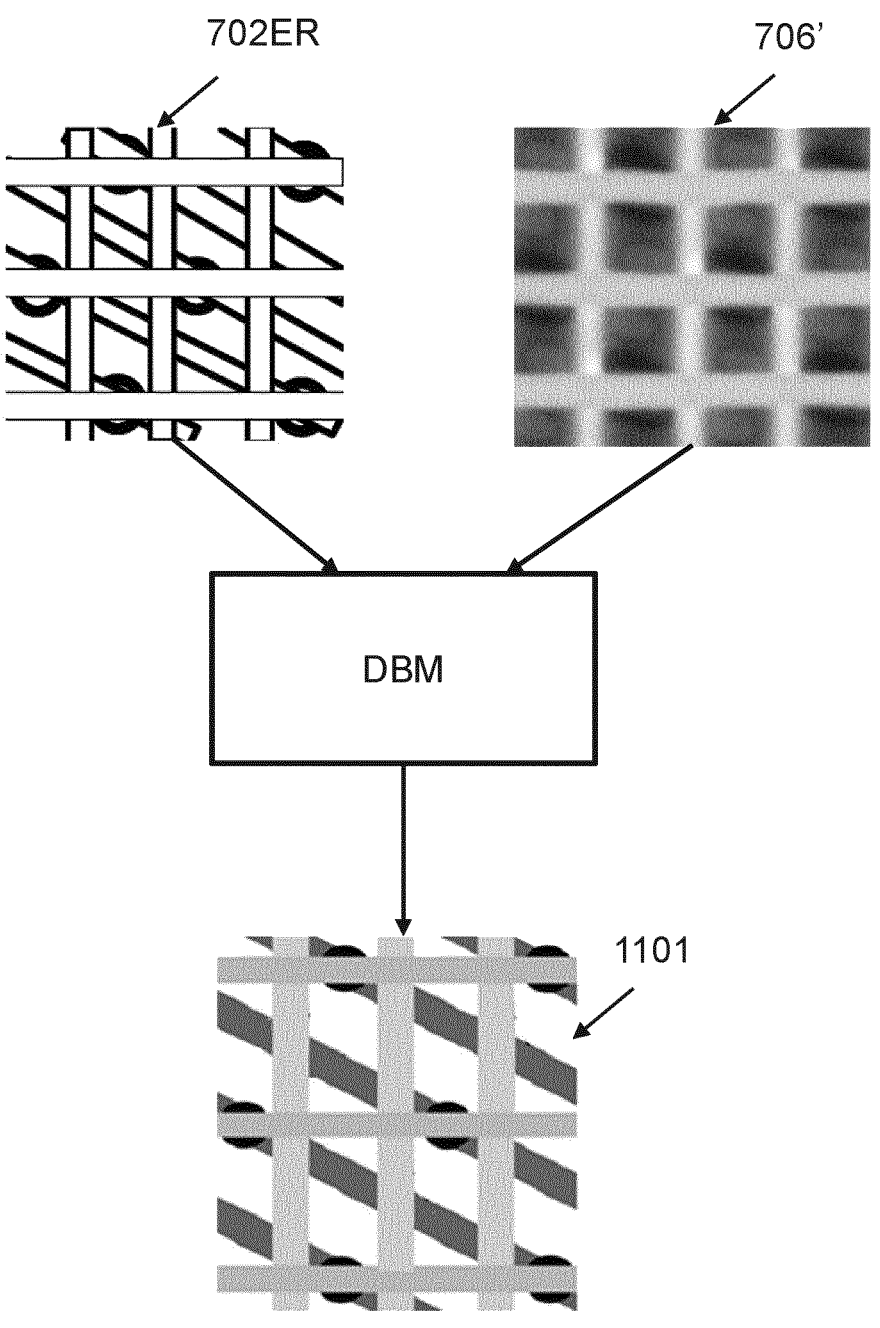
Figure 12:
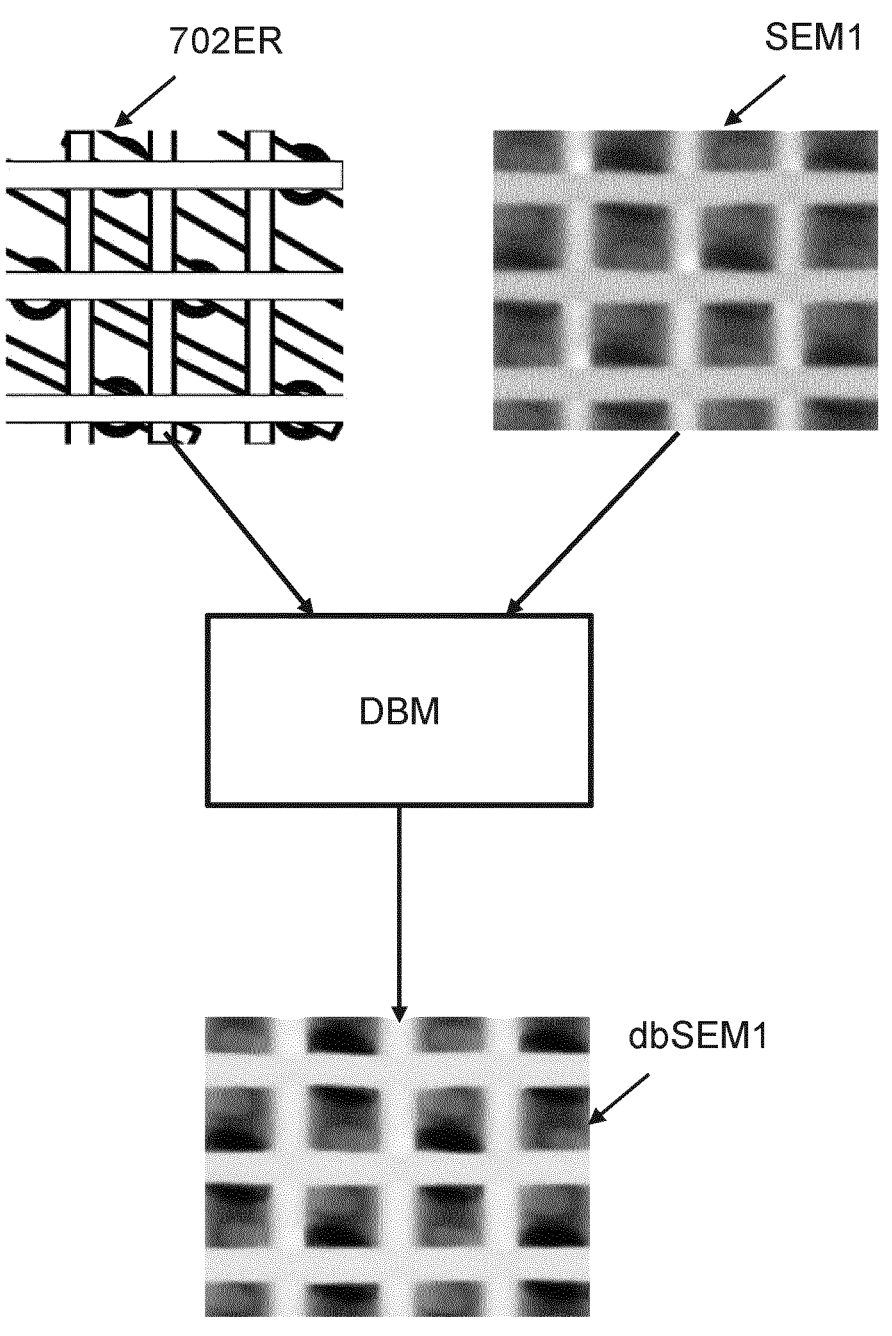
Figure 13:
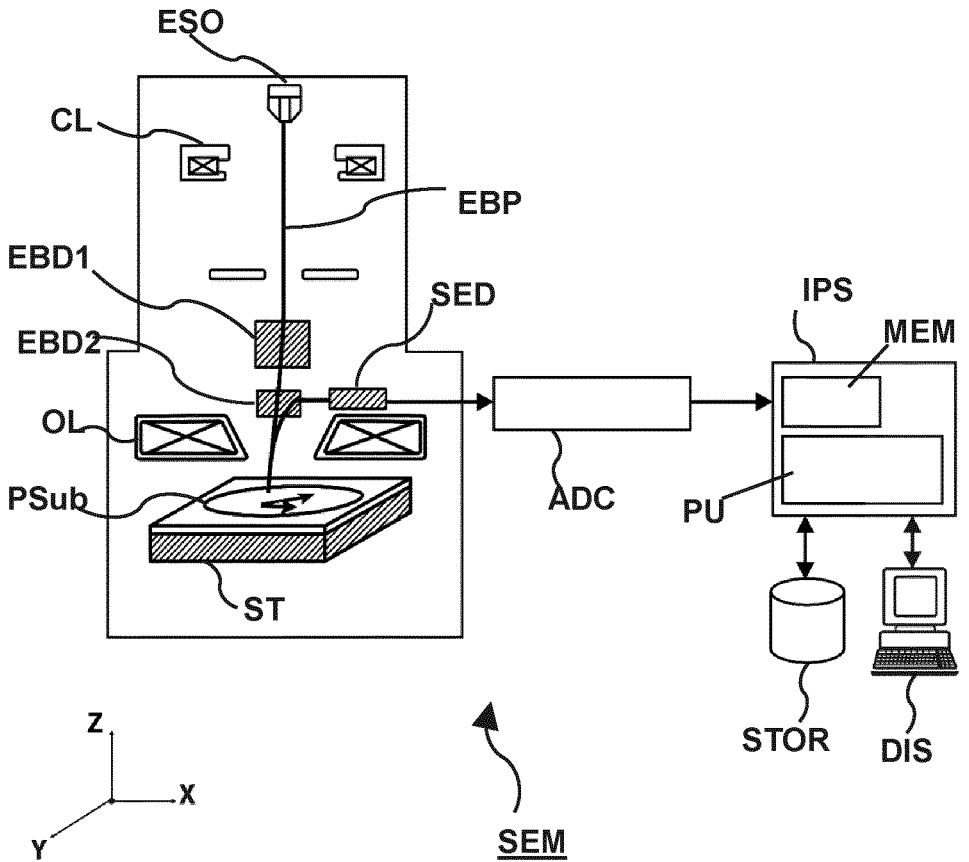
Figure 14:
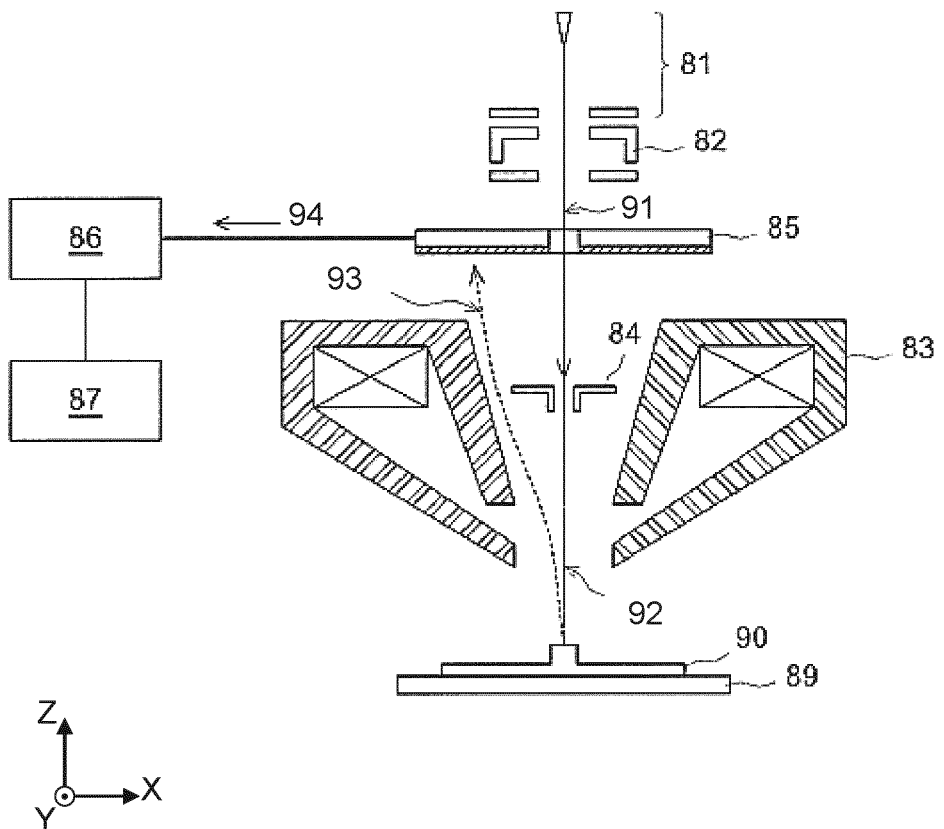
Figure 15:
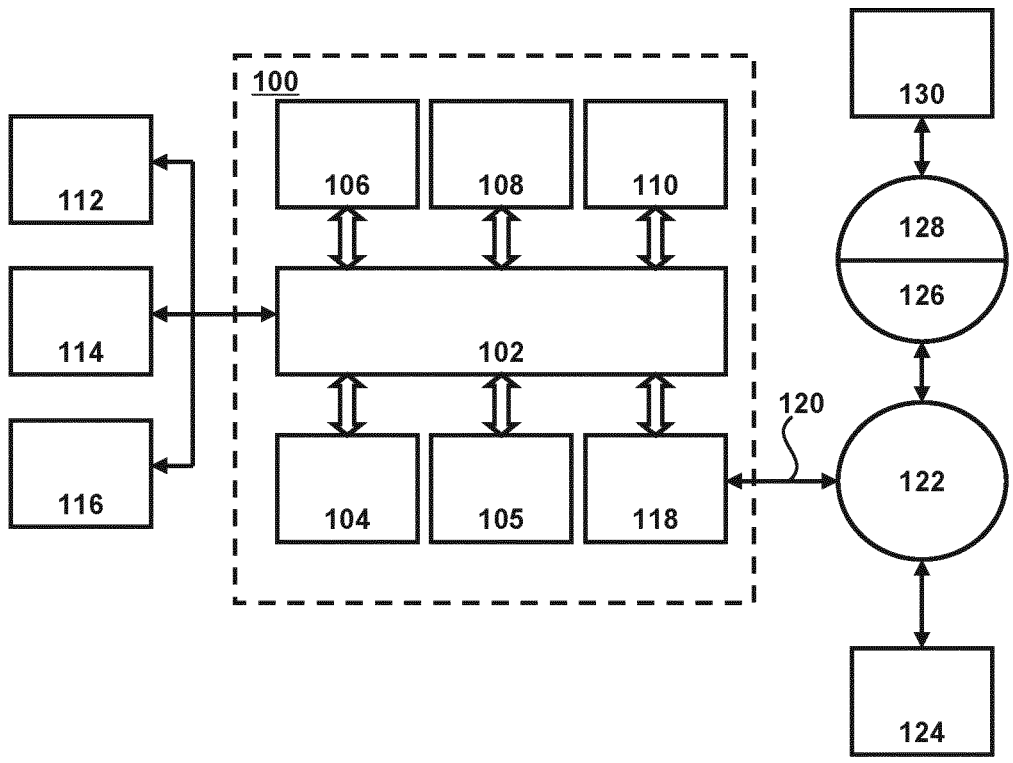
Figure 16:
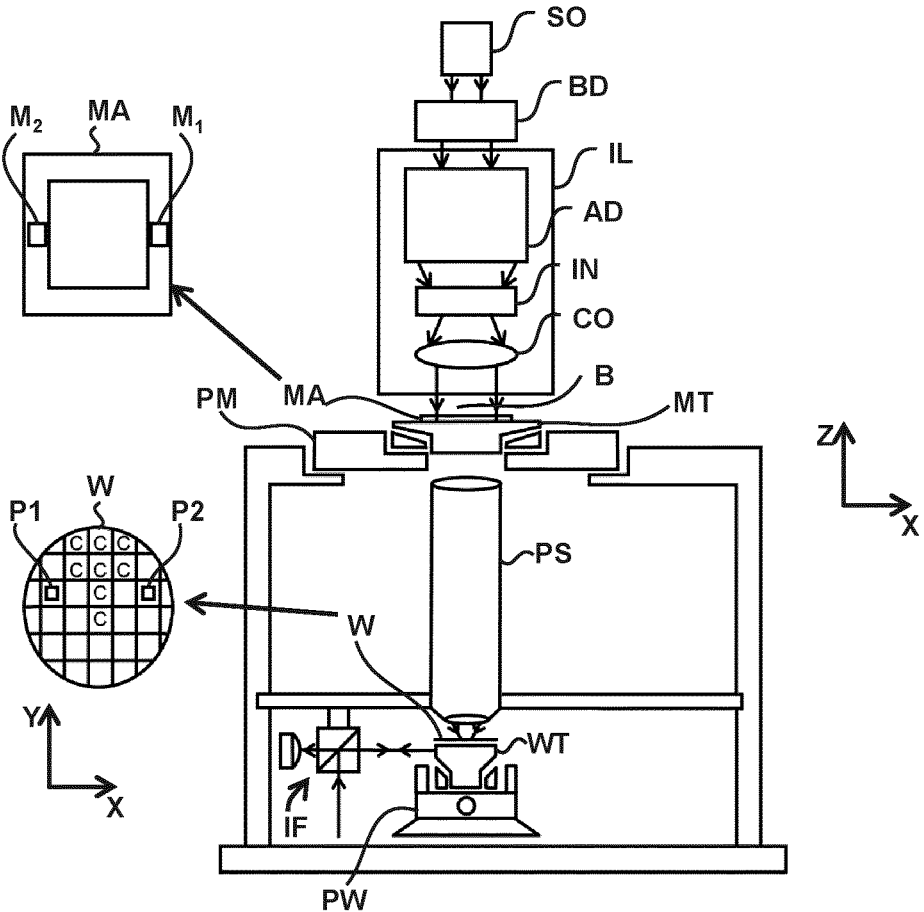
Figure 17:
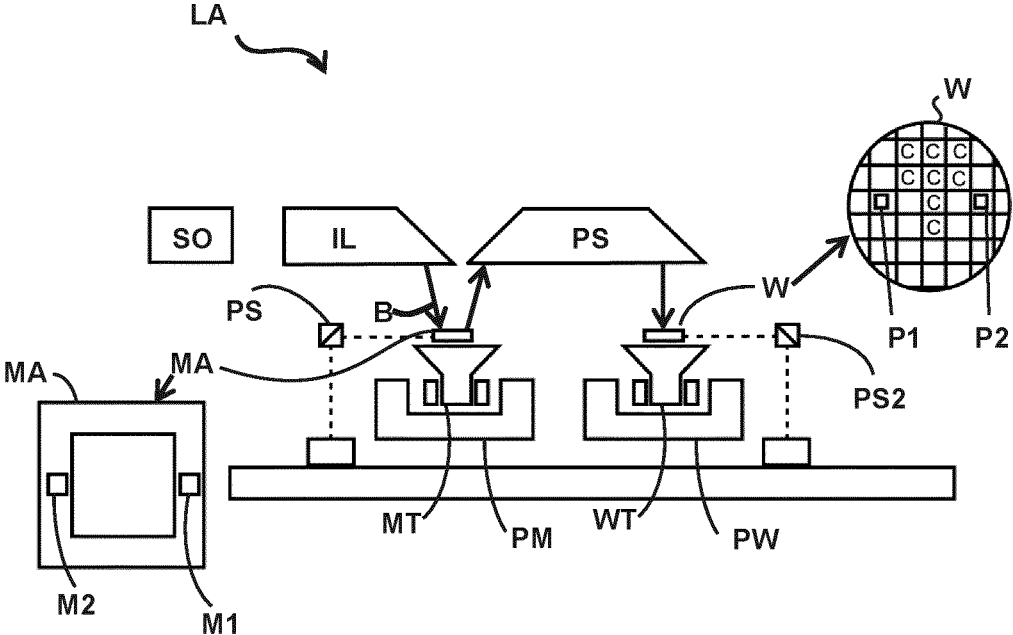
Figure 18:
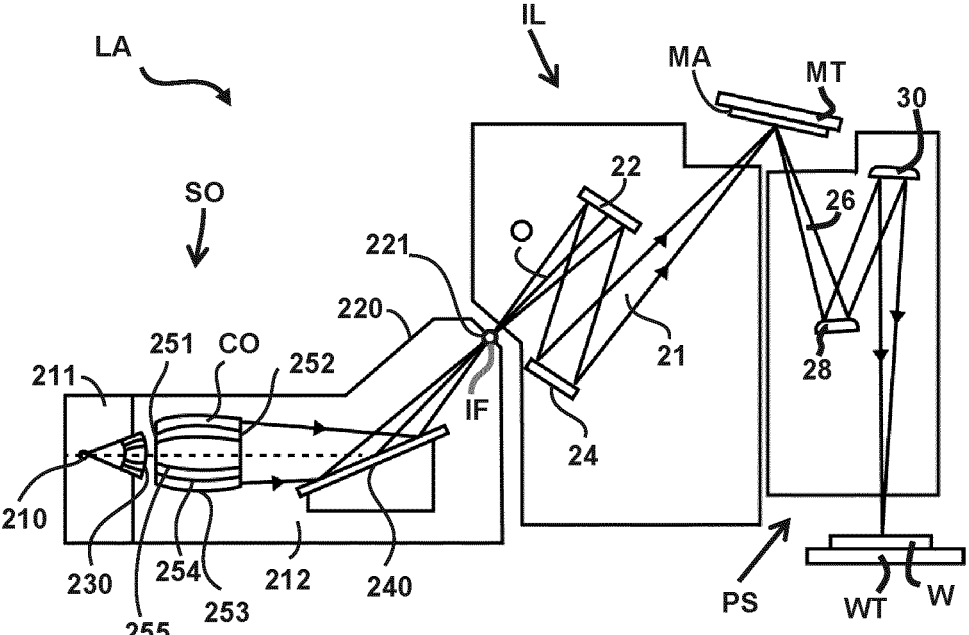
Figure 19:
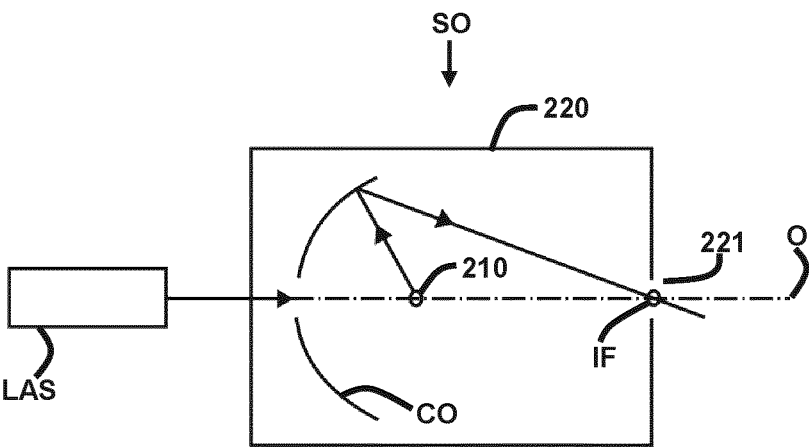

FIG. 5 is a flow chart of another method for deblurring a captured image of a patterned substrate, according to an embodiment;

FIG. 6 is a flow chart of yet another method for deblurring a captured image of a patterned substrate, according to an embodiment;

FIG. 7 illustrates generation of a simulated image from a target pattern, according to an embodiment;

FIG. 8A is a 2D image representation of a target pattern to be patterned on multiple layers, each layer associated with a different target feature, according to an embodiment;

FIG. 8B is a 2D image representation of an edge range data determined based on depth data corresponding to each feature of the target pattern (of FIG. 8A), according to an embodiment;

FIG. 9 illustrates generating a noisy simulated image, according to an embodiment;

FIG. 10 is a pictorial representation of a structure of the deblurring model configured according to the training in FIG. 3, according to an embodiment;

FIG. 11 illustrates an example of generating a deblurred image of a simulated image via a deblurring model using depth data as input, according to an embodiment;

FIG. 12 illustrates an example of deblurring a captured image, obtained via a scanning electron microscope, of a multilayered patterned substrate using the deblurring model and depth data, according to an embodiment;

FIG. 13 schematically depicts an embodiment of a scanning electron microscope (SEM), according to an embodiment;

FIG. 14 schematically depicts an embodiment of an electron beam inspection apparatus, according to an embodiment;

FIG. 15 is a block diagram of an example computer system, according to an embodiment;

FIG. 16 is a schematic diagram of a lithographic projection apparatus, according to an embodiment;

FIG. 17 is a schematic diagram of another lithographic projection apparatus, according to an embodiment;

FIG. 18 is a more detailed view of the apparatus in FIG. 16, according to an embodiment;

FIG. 19 is a more detailed view of the source collector module SO of the apparatus of FIG. 17 and FIG. 18, according to an embodiment.

DETAILED DESCRIPTION

An integrated circuit (IC) chip used in a device (e.g., phone, laptop, computer memory, etc.) includes complex circuit patterns. During manufacturing of such circuit patterns, it is desired to capture images of the circuit patterns that are printed on the chip (also referred as substrate) to determine whether desired circuit patterns are printed accurately. Often times, the captured images are blurry making it is difficult to identify individual circuit features of the circuit patterns. In one example, the deblurring in the captured image is caused because the circuit features are formed on multiple layers of the chip that are disposed one above another. As such, the captured image is deblurred for better identification of individual circuit features. The captured image is deblurred by a deblurring model that is particular trained for such complex applications.

One way to capture an image of the printed circuit pattern is using an image capture device which projects an electron-beam on the circuit pattern. The electrons of the electron-beam are diffracted in a different manner depending on properties of a layer on which a circuit feature of the circuit pattern is formed. To deblur an image, depth information of each layer is used herein. The depth information facilitates accurate modeling of deblurring effects at different layer depths. For example, the depth information can indicate that features on deep layers will appear more blurry than a top layer. As such, better deblurring of features of the circuit patterns that are located at different depths can be achieved, thereby resulting in a more accurate less blurry image, thereby facilitating accurate identification of individual circuit features.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

A critical dimension (CD) of a device refers the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

In the present document, the terms "radiation" and "beam" may be used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

Figure 1:
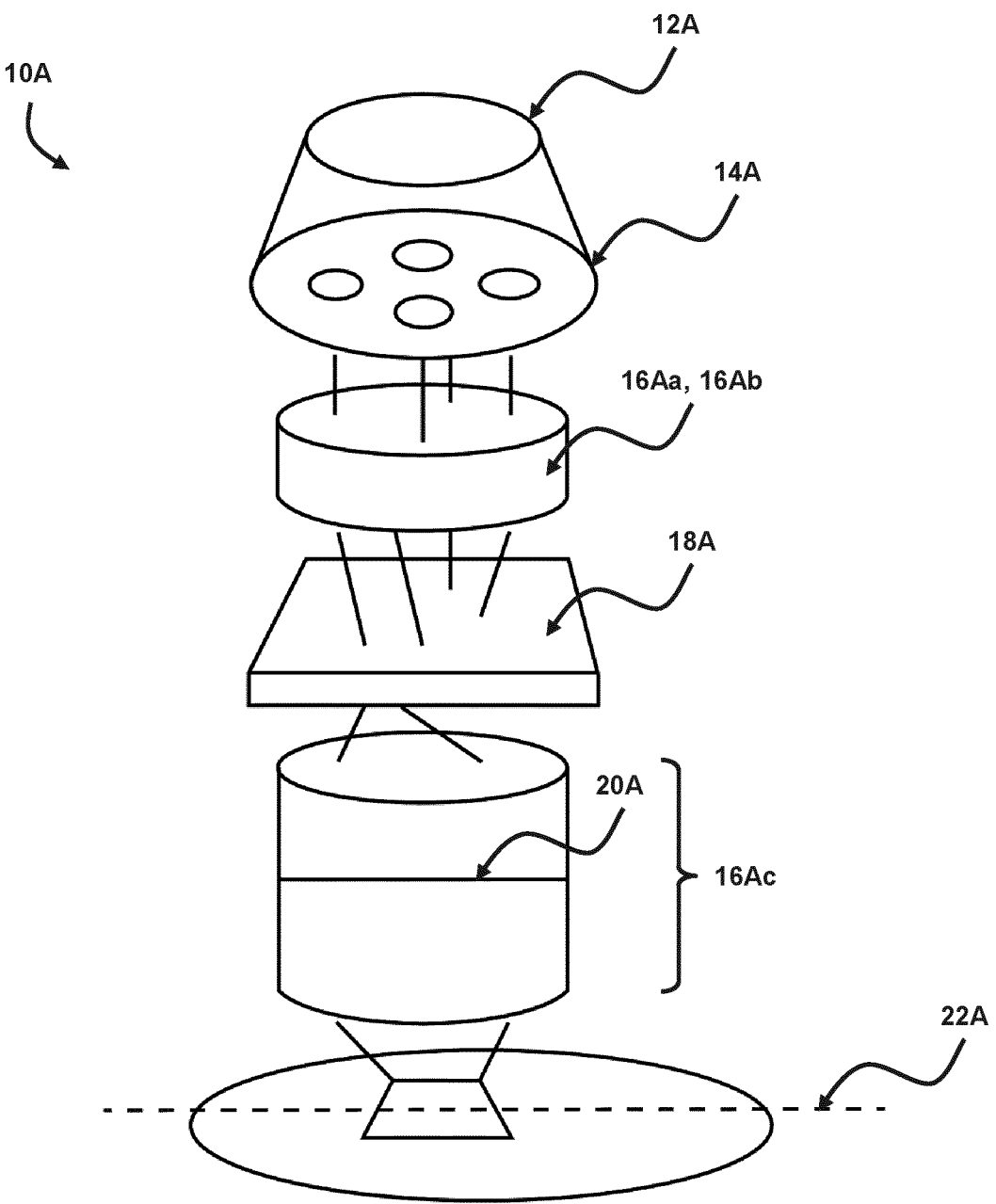
FIG. 1 shows a block diagram of various subsystems of a lithography system, according to an embodiment.

As a brief introduction, FIG. 1 illustrates an exemplary lithographic projection apparatus Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin $(\Theta_{max})$, wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

In chip manufacturing (also referred as a patterning process or semiconductor manufacturing), a target pattern (e.g., a circuit pattern) of a chip may be printed on multiple layers on a substrate, for example. Each layer has a specific feature (e.g., lines, contact holes, bars, etc.) of the target pattern (e.g., the circuit pattern). These features, when connected to each other, provide a desired electrical or logic function of a chip or a circuit. The features may be connected to each other through the multiple layers to form the target pattern of the chip.

Oftentimes, a patterned substrate is inspected or measured using a scanning electron microscope (SEM) to study the printing performance of the target pattern. The SEM image is inspected to ensure the target pattern of the chip is printed on the substrate within an acceptable threshold limits of physical characteristics associated with the features. If the printing performance is not within the acceptable threshold limits, a yield of the chip manufacturing is negatively affected. Based on the inspection, one or more processes of the chip manufacturing may be adjusted to improve the printing performance and the yield of the chip manufacturing.

Typically, a high landing energy (HLE) setting of SEM tool is used to measure patterns at high depth (e.g., at a third or fourth layer located vertically below a top layer) for inspection and metrology purpose. HLE SEM image signal mostly come from back scattering electrons (BSE). The BSE signal causes more blur in the SEM image. For example, based on the BSE's diffraction characteristics, in the SEM image, features on the most underneath layer (e.g., at largest depth from a top surface of the substrate) has the most diffraction effect seen in a form of edge blurring. As such, some deblur algorithm may be used to get more clear SEM image. For example, the deblur image is an image in which several features or feature boundaries are blurry. While, after deblurring the image, the feature boundaries have sharper edge or more clear edges.

Figures 2A, 2B, 2C:
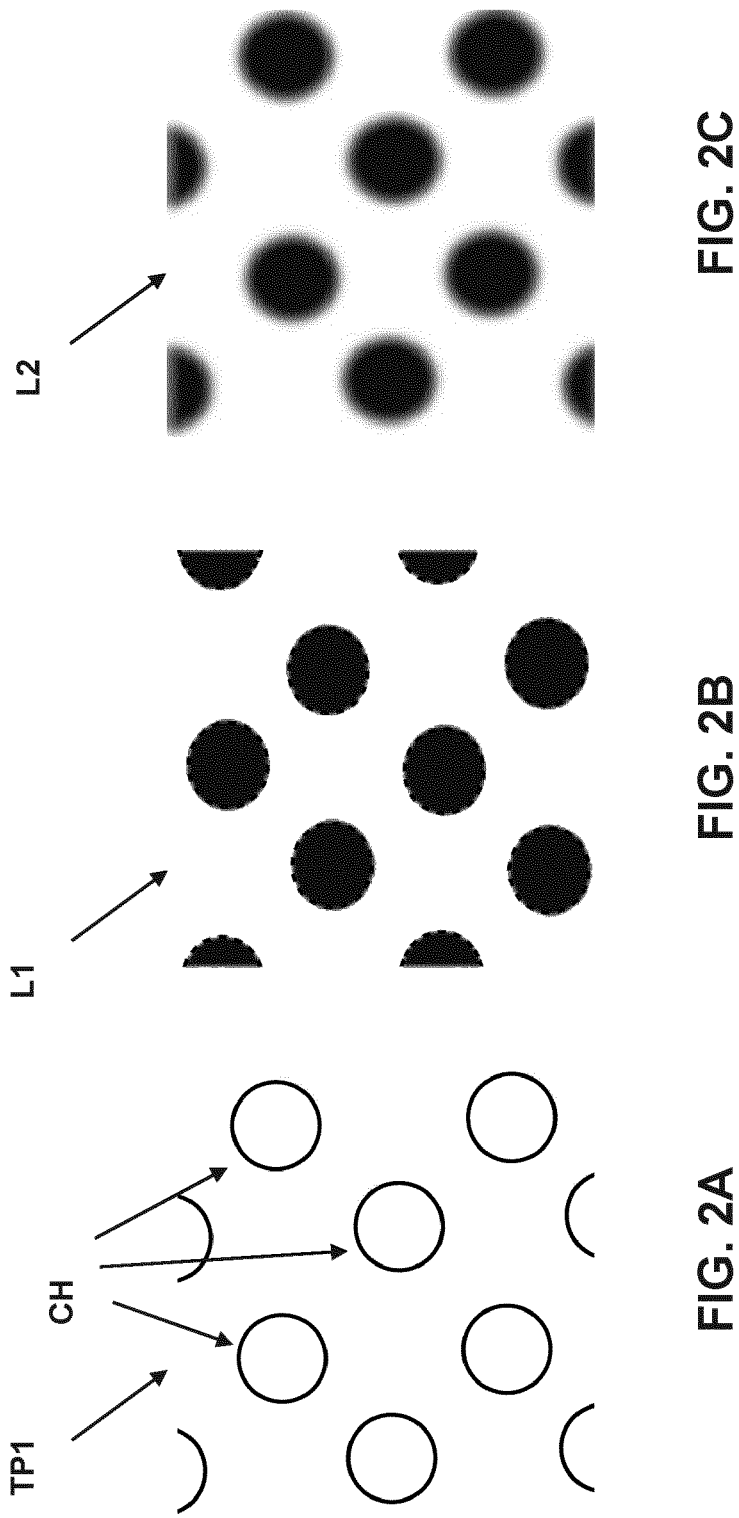
FIG. 2A is a pictorial depiction of a target pattern including a plurality of features (e.g., contact holes), according to an embodiment.
FIGS. 2B, 2C, 2D, and 2E are blurry images of a patterned substrate, wherein the target pattern (of FIG. 2A) is printed on a first layer, a second layer, a third layer, and a fourth layer, respectively, of the patterned substrate, according to an embodiment.

Referring to FIGS. 2A-2F, illustrates example of blurring caused due to the BSE diffraction effect for different layers of the substrate. FIG. 2A illustrates a target pattern TP1 (e.g., in GDS format) including a plurality of features (e.g., contact holes CHs (only few holes are marked for illustration purposes)). FIG. 2B illustrates a first pattern L1 corresponding to the target pattern TP1. In this example, the first pattern L1 is printed on a first layer (e.g., a top layer) of a substrate. The first pattern L1 may be formed at a first depth (e.g., 0 nm) on the substrate. The boundaries of the contact holes in the first pattern L1 are clear. For example, when the contact holes of the TP1 are overlaid on the first pattern L1, intensities of pixel (in L1) at the boundary of the holes show minimum to no variation. As such, contact holes in the first pattern L1 can be accurately identified. However, as depth of a layer on the substrate increases (e.g., vertically below a top layer), edges of the features (e.g., contact holes) become more and more blur. For example, the pixel intensities at the edge of the features varies substantially making it difficult to accurately discern the boundary of the features in the layers at high depths. Example blurring of features at increased depths is illustrates in FIGS. 2C, 2D, and 2E.

Figures 2D, 2E, 2F:
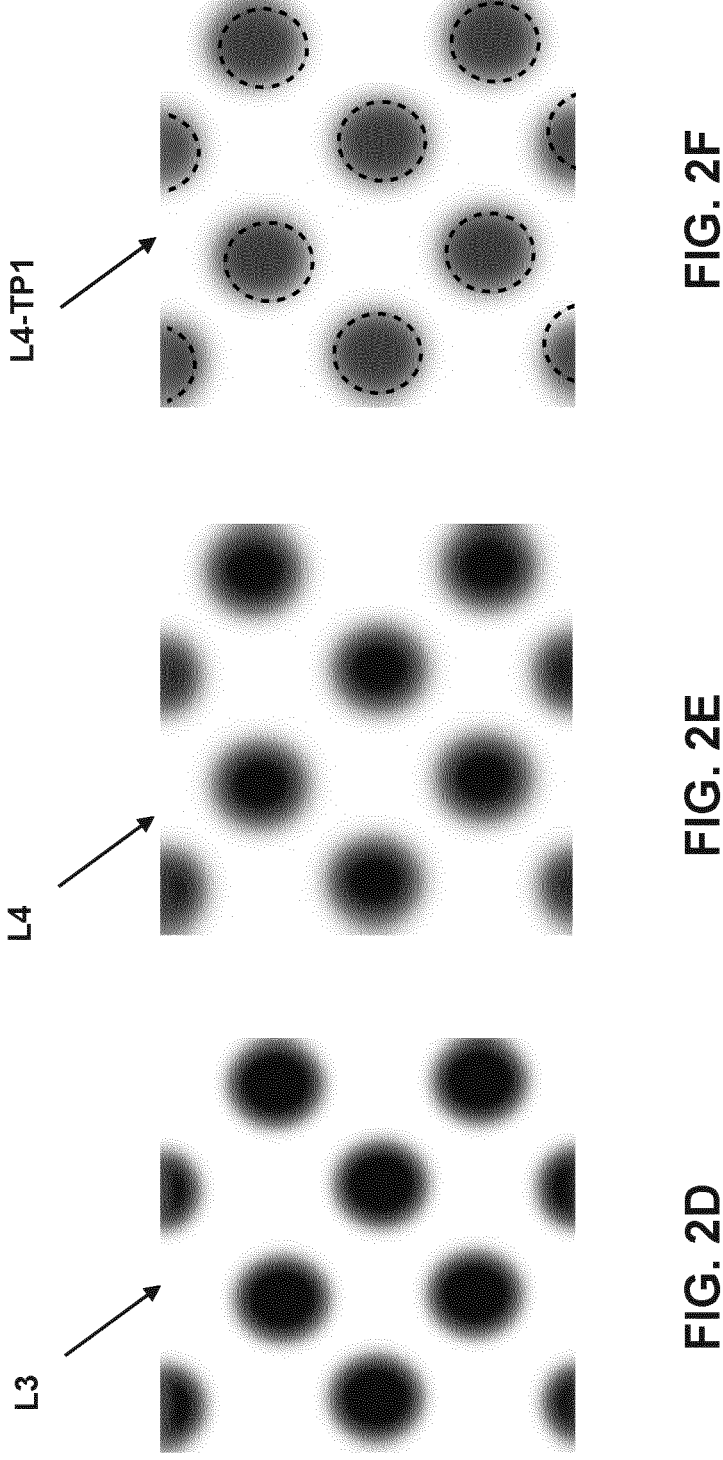
FIG. 2F is the blurry image of patterned substrate with the target pattern (dotted circles corresponding to FIG. 2A) overlaid on the image, the blurry image being of the fourth layer of the substrate, according to an embodiment.

FIG. 2C illustrates a second pattern L2 formed on a second layer L2 at a second depth (e.g., 2 nm vertically below the first layer). Observe that the edges of the features (dark circles) are blurrier compared to the edges of the features in the first pattern L1. FIG. 2D illustrates a third pattern L3 formed on a third layer L3 at a third depth (e.g., 5 nm vertically below the first layer). Observe that the edges of the features (dark circles) are blurrier compared to the edges of the features in the second pattern L2. Similarly, FIG. 2D illustrates a fourth pattern L4 formed on a fourth layer L3 at a fourth depth (e.g., 8 nm vertically below the first layer). Observe that the edges of the features (dark circles) are blurrier compared to the edges of the features in the third pattern L3. As such, referring to an image L4-TP1 in FIG. 2E, when a target pattern TP1 is overlaid on the fourth pattern L4, it is unclear where the edges of the features in L4 truly are.

Currently, methods for deblurring and denoising HLE SEM image have several challenges. For example, the feature boundaries of a deblurred HLE SEM image are unclear and inaccurate. Another issues is aliasing, which refers to distortion in the image that results when a signal reconstructed from samples is different from the original signal, thereby causing inaccurate edge determination. In SEM images of a multi-layered patterned substrate, BSE causes different diffraction at a first depth of a first layer than diffraction at a second depth of a second layer that makes the edge blurring more complicated. The traditional Monte-Carlo simulation used to analyze the diffraction effects takes long time. As it is difficult to obtain clean and accurate HLE SEM image, there is no ground truth images that can be used for improving one or more aspects of the patterning process. For example, for improving process model accuracies related to determining feature CDs.

The present disclosure provides a method for deblurring captured images based on depth data that causes deblurring of the captured image. In an embodiment, a deblurring model is trained using the effects of the depth of features from a top layer of the substrate to be patterned. For example, an effect of depth a feature can be seen on an edge of the feature. Deeper the feature from a top layer, more blurry the edge of the feature due to the BSE signals being weak compared to BSE signal from a top layer.

In an embodiment, the trained deblurring model can be employed in one or more lithography and metrology applications. For example, a captured image of a real patterned substrate having e.g., a memory circuit features may be deblurred via the deblurring model. From the deblurred image, the memory circuit features may be identified and extracted accurately. Such extracted features can be further provided to train more accurate process models (e.g., resist models, optical proximity correction (OPC) related models, etc.) related to lithography. In another application, accuracy of metrology data can be improved on account of more accurate feature geometry (e.g., shapes and sizes) being extracted from a deblurred image of the patterned substrate. Further, the deblurred image can improve the reliability of inspection of a patterned substrate.

FIG. 3 is a flow chart of a method 300 for training deblurring model configured to deblur a captured image of a patterned substrate. For better understanding the method, the discussion uses edges of a feature as an example characteristic affected due to depth of a feature from a top layer, for example. The deblurring of the captured image enables more accurate identification of a feature characteristic (e.g., a feature edge). In an embodiment, the process of training a deblurring model is further discussed in detail with respect to procedures P301, P303 and P305 below.

Process P301 involves obtaining, via a simulator using a target pattern TP from which a pattern on a substrate is derived, a simulated image 302 for the substrate corresponding to the target pattern TP. In an embodiment, the target pattern TP may be formed a plurality of layers of the substrate that are disposed vertically one below another, each layer having one or more features corresponding to target features of the target pattern. For example, a first target feature is be formed on a first layer of the substrate, and a second target feature is formed on a second layer located below the first layer of the substrate.

In an embodiment, the target pattern TP is presented in a form of a polygon-based hierarchical data format. For example, the polygon-based data format can be a graphical data system (GDS) format, colored image, vector format or other data representations. In an embodiment, the target pattern TP comprises geometric data associated with the first target feature, and the second target feature. The geometric data can be, for example, desired shapes of the first target feature and the second target feature, and target locations of the edges of the first target feature and the second target feature, respectively within the target pattern TP. In an embodiment, each target feature is associated with a layer of the substrate on which it can be formed.

In an embodiment, the simulated image 302 comprises noise such as a random variation of brightness or color information in images. In an embodiment, the obtaining the simulated image 302 further includes extracting noise from a captured image of a patterned substrate; and adding the noise to the simulated image 302. The captured image noise can be specific to an image capturing device, for example.

In an embodiment, the simulator comprises a model that is a function of physical characteristics of the substrate on which the target pattern TP will be printed. The simulator is configured to generate the simulated image 302 by adjusting BSE characteristic of an electron-beam of an image capture device (e.g., SEM). Upon adjusting the BSE characteristics different diffraction effects associated with the target pattern can take into account thereby allowing determination of a feature characteristics (e.g., edges, size, grey scale values, etc.) at each layer of the substrate. In an embodiment, the physical characteristic of the substrate can be a material of a particular layer, a thickness of the particular layer, a resist process parameter, an etch process parameter, or a combination thereof. The model used in the simulator can be a physics based model that models diffraction, physics of electron absorption/diffraction by a particular layer, etc. The model can be a statistical model fitted based on BSE data.

In an embodiment, the obtaining of the simulated image 302 involves simulating, via a Monte Carlo simulation process, the model to generate the simulated image 302. During the Monte Carlo simulation process, one or more BSE characteristics, depth of a layer, etc. can be adjusted to generate a simulated image 302. The simulated image 302 can be representative of a real image of a patterned substrate captured via an image capture device (e.g., SEM). In an embodiment, the obtaining of the simulated image 302 involves simulating a double Gaussian model configured to generate the simulated image 302 based on the depth data.

FIG. 7 illustrates an example of obtaining the simulated image from a simulator using a target pattern. An exemplary target pattern 702 (e.g., a DRAM circuit pattern) includes a plurality of features that are formed on different layers on the substrate. The target pattern 702 comprises first target features F1 (e.g., horizontal lines) to be formed on a first layer, second target features F2 (e.g., vertical lines) to be formed on a second layer, third features F3 (e.g., tilted bar) formed on a third layer, and fourth features F4 (e.g., circles) to be formed on a fourth layer.

In an embodiment, the target pattern 702 is input to a simulator 704 configured to generate a simulated image that will mimic a real patterned substrate. For example, the simulator 704 comprises Monte-Carlo simulation to a model. The model generates a simulated image of a substrate as a function of diffraction effects at different layers of the substrate. For example, in an embodiment, the model can be configured assign/change a number of electrons projected on the substrate. For example, the number of electrons can be approximately 2000, 2500, 3000, etc. Upon hitting a feature at a first layer, the model predicts that the back scattered electrons can be approximately 140. Furthermore, the model can be configured to input a landing energy of the electrons (e.g., 10 keV, 20 keV, etc.), a density of the electrons (e.g., approximately 2.4). Other than these example setting, the simulator 704 may be configured to include additional characteristics affecting the diffraction of electrons after hitting a target feature.

In an embodiment, the simulator 704 outputs a simulated image 706 that mimics an image of a real patterned substrate. In an embodiment, the simulated image 706 is a grey scale pixelated image, wherein each pixel intensity is a result of the simulator 704 predicting e.g., signal from BSE. As simulated images are used as training dataset, a deblur model can be trained to cover a large number of pattern compared to training dataset comprising real-SEM image, for example. Because, capturing a large number of SEM images may damage the pattered substrate, affect the yield of the patterning process, and slow down the semiconductor manufacturing.

FIG. 9 illustrate another example of generating the simulated image. In the present example, the simulated image 706 (generated via the simulator (e.g., Monte-Carlo simulation), as discussed above) is modified by adding an image noise 906. For example, the image noise 906 can be extracted from a real-SEM image or statically generated as a random noise. In an embodiment, the noise 906 can be extracted by applying a noise filter to a real-SEM image. Upon adding the noise to the simulated image, a noisy simulated image 706' is generated. In an embodiment, the noisy simulated image 706' may also be referred as a simulated image 706. In the present disclosure, the noisy simulated image 706' can be interchangeably referred as simulated image 706.

In an embodiment, using the simulated image 706' (comprising noise) as training data improves the robustness of the trained deblurring model. For example, the trained deblurring model will generate reliable results even if an inputted image (e.g., a real-SEM image) has substantial noise. For example, a noisy image may be due to poor image capturing condition, metrology setting, etc. Process P303 determining, based on depth data DEP associated with each layer of the substrate, edge range data ERD for features on the substrate corresponding to the first target feature and second target feature of the target pattern TP. The depth data DEP characterizes blurring of edges of the features on the substrate as a function of a depth of the respective feature from a top layer of the substrate.

In an embodiment, the depth data DEP comprises at least one of: a depth of a feature from a top layer of the substrate, material used in a particular layer of the substrate, diffraction behavior at the given depth of the feature. For example, the depth data DEP may include a first depth of the first layer located in a vertically downward direction from the top layer of the substrate, and a second depth of the second layer located in a vertically downward direction from the top layer; material data associated with the first layer and the second layer of the substrate; or diffraction behavior associated with a first feature and a second feature on the substrate corresponding to the first target feature and the second target feature of the target pattern TP, respectively.

In an embodiment, the edge range data ERD comprises a range of an edge location for features on the substrate corresponding to each feature within the target pattern TP. In an embodiment, the determining the edge range data ERD involves executing a model configured to compute edge variations of features on the substrate corresponding to each feature of the target pattern TP to be printed on the substrate. In an embodiment, the edge range data ERD is represented as an image of the target pattern TP supplemented with the edge range data ERD of each feature of the target pattern TP.

FIGS. 8A and 8B illustrate an example target pattern and corresponding edge range data associated with depth of the features within the target pattern. Referring to FIG. 8A, the exemplary target pattern 702 (e.g., a DRAM circuit pattern) includes a plurality of features that are formed on different layers on the substrate. As discussed earlier, the target pattern 702 comprises the first target features F1 (e.g., horizontal lines) to be formed on a first layer of a substrate, the second target feature F2 (e.g., vertical lines) to be formed on a second layer of the substrate, the third features F3 (e.g., tilted bar) formed on a third layer of the substrate, and the fourth features F4 (e.g., circles) to be formed on a fourth layer of the substrate.

In the present example, the first layer may be considered as a top layer. The second layer is a layer located at a depth (e.g., 5 nm) vertically below the first layer. The third layer is a layer located at a depth (e.g., 10 nm) vertically below the first layer. The fourth layer is a layer located at a depth (e.g., 15 nm) vertically below the first layer. Accordingly, the features F1, F2, F3, and F4 will be printed on the respective layers of the substrate (not illustrated). Upon capturing an image of the patterned substrate, the most underneath layer (e.g., having features F4 at largest depth) image will have the most diffraction effect (e.g., edges of features F4 will be more blurring) due to the BSE backscattered electron characteristics. In an embodiment, the variation in characteristic is related to such depth data, for example, based on the depth of each feature (e.g., F1, F2, F3, F4). Based on the depth data of each feature, an edge range data of each feature may be determined. The edge range data characterizes a range within which an edge of the feature may lie on the substrate.

FIG. 8B is a pictorial depiction of the edge range data 702ER generated for the target pattern 702. In the edge range data 702ER, the thickness of each feature represents a range of that feature. For example, the thickness of lines E1 (corresponding to features F1), lines E2 (corresponding to features F2), lines E3 (corresponding to features F3), and lines E4 (corresponding to features F4) indicate an amount by which diffraction at the edges of the features F1, F2, F3, and F4 will be affect due the depth data. For example, lines E4 will be associated with highest variation in BSE diffraction signal. When such edge range data E1, E2, E3, and E4 is used as training data set, more accurate determination of features edges can be made in high blur regions.

In an embodiment, the edge range data 702ER may be determined using a model (e.g., similar to one used in the simulator 704 discussed with respect to FIG. 7). The model is configured to determine an edge range data for features on the substrate based on the depth data e.g., material data of each layer, diffraction characteristic associated with the material and the depth, etc. For example, the material of the feature F1 is chromium, the material of the feature F2 is copper, material of the feature F3 is tungsten, material of the feature F4 is poly resin material. The material discussed herein are only exemplary and does not limit the scope of the present disclosure. The material of the layer can be SiO, Si, or other materials used in semiconductor manufacturing. In an embodiment, the model can be a function (or mapping) between the edge range, the depth of a layer and the material of the layer. Such function (or mapping) may be established by correlation real-data of a feature, material, depth of a patterned substrate, for example.

Process P305 adjusting, using the simulated image 302 and the edge range data ERD for the features on the substrate corresponding to the target pattern TP as training data, parameters of a base model to generate the deblurring model DBM. The deblurring model DBM generates a deblur image of the captured image of the patterned substrate using edge range data ERD associated with the captured image. The present disclosure is not limited to a particular type of model, as long as it is configured to receive edge range data and a captured image as input and generate a deblurred image of the captured image.

In an embodiment, the base model or the deblurring model DBM is a machine learning model comprises weights and biases as model parameters. During the training process, the weights and biases of the base model are continuously updated based on the training data. At the end of the training, the base model is referred as the deblurring model. In an embodiment, the deblurring model DBM is convolutional neural network (e.g., CNN), a deep convolutional network (DCNN). The model parameters comprises weights and biases of one or more layers of the deep convolutional network.

In an embodiment, the deblurring model DBM is a neural network including a feature vector comprising values indicative of a feature of the target pattern TP, and an attention vector comprising values that are related to depth associated with the feature to be printed on the substrate, the attention vector being configured to operate with the feature vector. In an embodiment, the attention vector comprises the any values in a range from 0 to 1, or binary values 0 or 1.

In an embodiment, structure of the machine learning model is configured to multiply the attention vector with the feature vector so that an edge of a particular feature of the feature vector is assigned a depth related weight by the attention vector. For example, the first target feature associated with the first layer of the substrate is multiplied by a higher attention value compared to the attention value multiplied with the second target feature associated with the second layer of the substrate.

FIG. 10 is a pictorial depiction of an example structure of the deblurring model DBM that is configured to receive an image (e.g., SEM or simulated image of target pattern TP) and depth related data (e.g., edge range data ERD). As shown, each input may be represented as a feature vector FV. For example, the feature vector may be a vector representation of the captured image (e.g., simulated image or real-SEM image). In an embodiment, the feature vector FV comprises information such as location, and intensities of pixels. In an embodiment, the intensity values are indicative of a feature of the target pattern (e.g., TP). Optionally, another layer is provided comprising statistic information of the feature vector.

In an embodiment, the deblurring model also includes an attention vector AV comprising values that are related to depth associated with the feature to be printed on the substrate. In the present example, at one layer, an attention vector comprises the any values in a range from 0 to 1 (or other values e.g., 1-100). For example, in vector AV viewed from top to bottom, a first depth is assigned a value 0.95, a second depth is assigned a value 0.8, a third depth is assigned a value 0.6, and a fourth depth is assigned value 0.5. In an embodiment, the edge range data (e.g., ERD) is used to generate the attention values (or weights) and then applied to a feature map (e.g., a transformed SEM image at a particular layer of a CNN).

In an embodiment, the feature vector of a simulated image or a captured image is operated with the attention vector AV (e.g., generated from edge range data ERD). As such, the feature vector FV gets transformed into another vector FVX. The transformed feature vector FVX thus has the depth data accounted for.

FIG. 11 illustrates and example of training of the deblurring model DBM using the simulated image 706' (with noise) and edge range data 702ER associated with the target pattern TP. The deblurring model DBM generates a deblurred image 1101 having clearly defined boundaries of the feature in the target pattern TP (not shown in FIG. 11). As the feature boundaries are clearly distinguishable, the deblurring model DBM is considered trained.

Figure 4:
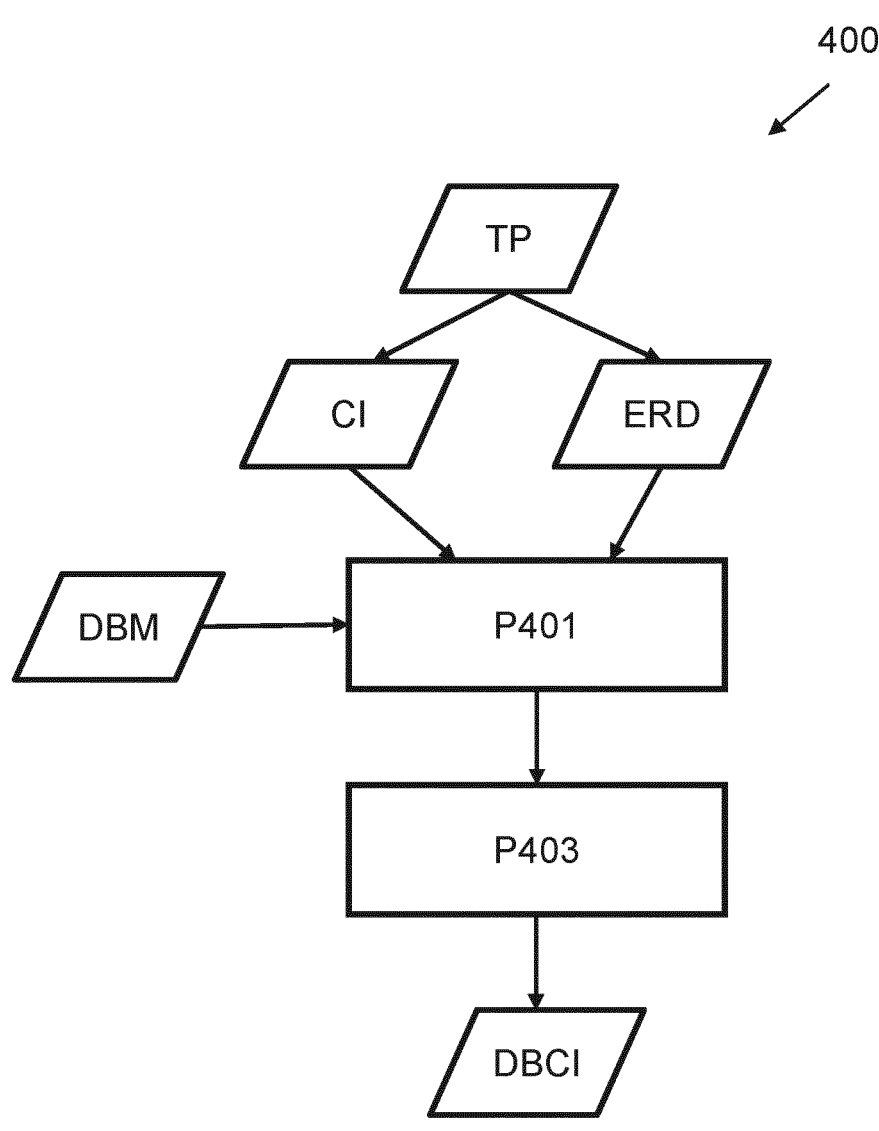
FIG. 4 is a flow chart of a method for deblurring a captured image of a patterned substrate, according to an embodiment.

FIG. 4 is a flow chart of a method 400 of deblurring a captured image of a patterned substrate. For example, a metrology tool (e.g., SEM image) may be used to capture the image of the patterned substrate. Exemplary implementation of the method includes processes P401 and P403. The processes can be executed via one or more processors of a computer system discussed herein. In an embodiment, the processes are implemented in a processor of a metrology tool (e.g., SEM tool).

Process P401 involves inputting the captured image CI of the patterned substrate and edge range data ERD associated with a target pattern to a deblurring model DBM. As discussed above, the deblurring model DBM is trained based on edge range data ERD associated with features of the target pattern at certain depth.

As discussed earlier, the edge range data ERD for features on the substrate corresponding to the features of the target pattern is determined based on depth data associated with the target pattern and the substrate. The depth data comprises a first depth of a first layer located in a vertically downward direction from a top layer of the substrate, and a second depth of the second layer located in a vertically downward direction from the top layer; material data associated with the first layer and the second layer of the substrate, diffraction behavior associated with a first feature and a second feature on the substrate corresponding to the first target feature and the second target feature of the target pattern TP, respectively, or a combination thereof.

In an embodiment, the edge range data ERD comprises a range of an edge location for features on the substrate corresponding to each feature within the target pattern. In an embodiment, the determining the edge range data ERD includes executing a model configured to compute edge variations of features on the substrate corresponding to each feature of the target pattern. In an embodiment, the edge range data ERD is represented as an image of the target pattern supplemented with the edge range data ERD of each feature of the target pattern.

Process P403 involves deblurring the captured image CI by executing the deblurring model. The resulting deblurred image DBCI has clearer edges of the features even at deeper layers (e.g. at 10 nm, 20 nm, 30 nm deep from a top of the substrate).

FIG. 12 illustrates an example of method of deblurring a real-captured SEM image. The deblurring involves inputting a captured image SEMI of a patterned substrate and edge range data 702ER associated with a target pattern (e.g., TP use to pattern the substrate) to a deblurring model DBM. As discussed above, the deblurring model DBM is trained using the edge range data ERD associated with features of the target pattern at certain depth. Then, the captured image is blurred by executing the deblurring model DBM. The deblurring model DBM outputs deblurred image dbSEM1.

FIG. 5 is another flow chart of a method 500 for deblurring a captured image of a pattered substrate. In this embodiment, the method includes processes P501, P503, P505, and P507, as discussed below.

Process P501 involves receiving a captured image CI of a patterned substrate. For example, the captured image CI can be received via a metrology tool (e.g., FIG. 13 and FIG. 14). The patterned substrate may be a multi-layered patterned substrate. As such, a high landing energy may be used to capture the image showing multi-layered patterns in the image. As discussed herein, due to the backscattered electrons have weak signals for deep layers (e.g., at depth 5 nm, 10n, 20 nm, bottommost layer, etc.), as such the captured image CI will be blurry. For example, features on deep layers will appear blurry in the captured image CI. As such, deblurring of the captured image CI is performed.

Process P503 involves inputting the captured image CI into a deblurring model. The deblurring model is trained by processes P301, P303, and P305 (in FIG. 3). Process P505 involves receiving an output from the deblurring model using the captured image CI and edge range data for features of the patterned substrate. The output being a deblurred captured image CI. Process P507 involves generating for display, on a user interface, a deblurred version of the captured image CI. In an embodiment, the deblurred version may be generated as a vector that can be input to other models related to the patterning process. As such, the deblurred version can be used to improve one or more aspects of the patterning process. For example, improve, OPC, dose, focus, etc.

FIG. 6 is another flow chart of a method 600 for deblurring a captured image of a pattered substrate. In this embodiment, the method includes processes P601, and P603, as discussed below.

Process P601 involves identifying features in the captured image CI based on a target pattern TP6 and depth data DD associated with each layer of the substrate. In an embodiment, the depth data comprises data such as depth, material, and diffraction characteristic at a particular depth of the substrate. In an embodiment, the depth data DD comprises feature characteristic derived from depth data DD. For example, the feature characteristic can be edge range of each feature at a particular layer. Process P603 involves deblurring the captured image CI by deblurring each of the features based on the target pattern TP6 and the depth data DD6. After deblurring, a deblurred image DBCI of the captured image CI is obtained. For example, FIG. 12 shows an example of deblurred image dbSEM1.

As discussed herein, an example of a deblurring model is a machine learning model. Both unsupervised machine learning and supervised machine learning models may be used to generate deblurred images from an input noisy images such as SEM images of a patterned substrate. Without limiting the scope of the invention, applications of supervised machine learning algorithms are described below.

Supervised learning is the machine learning task of inferring a function from labeled training data. The training data includes a set of training examples. In supervised learning, each example is a pair having an input object (typically a vector) and a desired output value (also called the supervisory signal). A supervised learning algorithm analyzes the training data and produces an inferred function, which can be used for mapping new examples. An optimal scenario will allow the algorithm to correctly determine the class labels for unseen instances. This requires the learning algorithm to generalize from the training data to unseen situations in a "reasonable" way.

Given a set of N training examples of the form $\{(x_1,y_1), (x_2,y_2), \ldots, (x_N,y_N)\}$ such that $x_i$ is the feature vector of the i-th example and $y_i$ is its label (i.e., class), a learning algorithm seeks a function $g:X\rightarrow Y$, where X is the input space and Y is the output space. A feature vector is an n-dimensional vector of numerical features that represent some object. Many algorithms in machine learning require a numerical representation of objects, since such representations facilitate processing and statistical analysis. When representing images, the feature values might correspond to the pixels of an image, when representing texts perhaps term occurrence frequencies. The vector space associated with these vectors is often called the feature space. The function g is an element of some space of possible functions G, usually called the hypothesis space. It is sometimes convenient to represent g using a scoring function $f:X \times Y \to \mathbb{R}$ such that g is defined as returning the y value that gives the highest score:

$$g(x) = \operatorname*{argmax}_{y} f(x, y)$$

Let F denote the space of scoring functions.

Although G and F can be any space of functions, many learning algorithms are probabilistic models where g takes the form of a conditional probability model $g(x)=P(y|x)$, or f takes the form of a joint probability model $f(x,y)=P(x,y)$. For example, naive Bayes and linear discriminant analysis are joint probability models, whereas logistic regression is a conditional probability model.

There are two basic approaches to choosing f or g: empirical risk minimization and structural risk minimization. Empirical risk minimization seeks the function that best fits the training data. Structural risk minimization includes a penalty function that controls the bias/variance tradeoff.

In both cases, it is assumed that the training set has a sample of independent and identically distributed pairs $(x_i, y_i)$. In order to measure how well a function fits the training data, a loss function $L:Y \times Y \to \mathbb{R}^{\geq 0}$ is defined. For training example $(x_i, y_i)$, the loss of predicting the value $\hat{y}$ is $L(y_i, \hat{y})$.

The risk R(g) of function g is defined as the expected loss of g. This can be estimated from the training data as $$R_{emp}(g) = \frac{1}{N} \sum_i L(y_i, g(x_i)).$$

Exemplary models of supervised learning include decision trees, ensembles (bagging, boosting, random forest), k-NN, linear regression, naive Bayes, neural networks, logistic regression, perceptron, support vector machine (SVM), relevance vector machine (RVM), and deep learning.

SVM is an example of supervised learning model, which analyzes data and recognizes patterns and can be used for classification and regression analysis. Given a set of training examples, each marked as belonging to one of two categories, a SVM training algorithm builds a model that assigns new examples into one category or the other, making it a non-probabilistic binary linear classifier. A SVM model is a representation of the examples as points in space, mapped so that the examples of the separate categories are divided by a clear gap that is as wide as possible. New examples are then mapped into that same space and predicted to belong to a category based on which side of the gap they fall on.

In addition to performing linear classification, SVMs can efficiently perform a non-linear classification using what is called the kernel methods, implicitly mapping their inputs into high-dimensional feature spaces.

Kernel methods involve a user-specified kernel, i.e., a similarity function over pairs of data points in raw representation. Kernel methods owe their name to the use of kernel functions, which enable them to operate in a high-dimensional, implicit feature space without ever computing the coordinates of the data in that space, but rather by simply computing the inner products between the images of all pairs of data in the feature space. This operation is often computationally cheaper than the explicit computation of the coordinates. This approach is called the "kernel trick."

The effectiveness of SVM depends on the selection of kernel, the kernel's parameters, and soft margin parameter C. A common choice is a Gaussian kernel, which has a single parameter $\gamma$. The best combination of C and $\gamma$ is often selected by a grid search (also known as "parameter sweep") with exponentially growing sequences of C and $\gamma$, for example, $C \in \{2^{-5}, 2^{-4}, \ldots, 2^{15}, 2^{16}\}$; $\gamma \in \{2^{-15}, 2^{-14}, \ldots, 2^4, 2^5\}$.

A grid search is an exhaustive searching through a manually specified subset of the hyperparameter space of a learning algorithm. A grid search algorithm is guided by some performance metric, typically measured by cross-validation on the training set or evaluation on a held-out validation set.

Each combination of parameter choices may be checked using cross validation, and the parameters with best cross-validation accuracy are picked.

Cross-validation, sometimes called rotation estimation, is a model validation technique for assessing how the results of a statistical analysis will generalize to an independent data set. It is mainly used in settings where the goal is prediction, and one wants to estimate how accurately a predictive model will perform in practice. In a prediction problem, a model is usually given a dataset of known data on which training is run (training dataset), and a dataset of unknown data (or first seen data) against which the model is tested (testing dataset). The goal of cross validation is to define a dataset to "test" the model in the training phase (i.e., the validation dataset), in order to limit problems like overfitting, give an insight on how the model will generalize to an independent data set (i.e., an unknown dataset, for instance from a real problem), etc. One round of cross-validation involves partitioning a sample of data into complementary subsets, performing the analysis on one subset (called the training set), and validating the analysis on the other subset (called the validation set or testing set). To reduce variability, multiple rounds of cross-validation are performed using different partitions, and the validation results are averaged over the rounds.

The final model, which can be used for testing and for classifying new data, is then trained on the entire training set using the selected parameters.

Another example of supervised learning is regression. Regression infers the relationships between a dependent variable and one or more independent variables, from a set of values of the dependent variables and corresponding values of the independent variables. Regression may estimate the conditional expectation of the dependent variable given the independent variables. The inferred relationships may be called the regression function. The inferred relationships may be probabilistic.

In an embodiment, there is provided a system that can use the model DBM to generate deblur images after the system captures images of a patterned substrate. In an embodiment, the system can be, for example, a SEM tool of FIG. 13 or an inspection tool of FIG. 14 that are configured to include the model DBM discussed herein. For example, the metrology tool includes an e-beam generator to capture an image of a patterned substrate; and one or more processors including the deblurring model. The one or more processors are configured to execute a trained model using the captured image and depth data (e.g., edge range data) of the target pattern as input to generate a deblurred image of the captured image. As mentioned earlier, the deblurring model DBM may be a convolutional neural network.

Furthermore, in an embodiment, the one or more processors may be further configured to update the deblurring model based on a captured image of a patterned substrate. In an embodiment, the updating of the deblurring model includes execute the deblurring model using the captured to generate the deblurred image; and update one or more parameters of the deblurring model based on a comparison of the deblurred image with a reference deblurred image.

In an embodiment, the deblurred images can be used to improve patterning process. For example, the deblurred images can be used in simulation of the patterning process, for example, to predict contours, CDs, edge placement (e.g., edge placement error), etc. in the resist and/or etched image. The objective of the simulation is to accurately predict, for example, edge placement, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

In some embodiments, the inspection apparatus or the metrology apparatus may be a scanning electron microscope (SEM) that yields an image of a structure (e.g., some or all the structure of a device) exposed or transferred on the substrate. FIG. 13 depicts an embodiment of a SEM tool. A primary electron beam EBP emitted from an electron source ESO is converged by condenser lens CL and then passes through a beam deflector EBD1, an ExB deflector EBD2, and an objective lens OL to irradiate a substrate PSub on a substrate table ST at a focus.

When the substrate PSub is irradiated with electron beam EBP, secondary electrons are generated from the substrate PSub. The secondary electrons are deflected by the ExB deflector EBD2 and detected by a secondary electron detector SED. A two-dimensional electron beam image can be obtained by detecting the electrons generated from the sample in synchronization with, e.g., two dimensional scanning of the electron beam by beam deflector EBD1 or with repetitive scanning of electron beam EBP by beam deflector EBD1 in an X or Y direction, together with continuous movement of the substrate PSub by the substrate table ST in the other of the X or Y direction.

A signal detected by secondary electron detector SED is converted to a digital signal by an analog/digital (A/D) converter ADC, and the digital signal is sent to an image processing system IPU. In an embodiment, the image processing system IPU may have memory MEM to store all or part of digital images for processing by a processing unit PU. The processing unit PU (e.g., specially designed hardware or a combination of hardware and software) is configured to convert or process the digital images into datasets representative of the digital images. Further, image processing system IPU may have a storage medium STOR configured to store the digital images and corresponding datasets in a reference database. A display device DIS may be connected with the image processing system IPU, so that an operator can conduct necessary operation of the equipment with the help of a graphical user interface.

As noted above, SEM images may be processed to extract contours that describe the edges of objects, representing device structures, in the image. These contours are then quantified via metrics, such as CD. Thus, typically, the images of device structures are compared and quantified via simplistic metrics, such as an edge-to-edge distance (CD) or simple pixel differences between images. Typical contour models that detect the edges of the objects in an image in order to measure CD use image gradients. Indeed, those models rely on strong image gradients. But, in practice, the image typically is noisy and has discontinuous boundaries. Techniques, such as smoothing, adaptive thresholding, edge-detection, erosion, and dilation, may be used to process the results of the image gradient contour models to address noisy and discontinuous images, but will ultimately result in a low-resolution quantification of a high-resolution image. Thus, in most instances, mathematical manipulation of images of device structures to reduce noise and automate edge detection results in loss of resolution of the image, thereby resulting in loss of information. Consequently, the result is a low-resolution quantification that amounts to a simplistic representation of a complicated, high-resolution structure.

So, it is desirable to have a mathematical representation of the structures (e.g., circuit features, alignment mark or metrology target portions (e.g., grating features), etc.) produced or expected to be produced using a patterning process, whether, e.g., the structures are in a latent resist image, in a developed resist image or transferred to a layer on the substrate, e.g., by etching, that can preserve the resolution and yet describe the general shape of the structures. In the context of lithography or other pattering processes, the structure may be a device or a portion thereof that is being manufactured and the images may be SEM images of the structure. In some instances, the structure may be a feature of semiconductor device, e.g., integrated circuit. In this case, the structure may be referred as a pattern or a desired pattern that comprises a plurality of feature of the semiconductor device. In some instances, the structure may be an alignment mark, or a portion thereof (e.g., a grating of the alignment mark), that is used in an alignment measurement process to determine alignment of an object (e.g., a substrate) with another object (e.g., a patterning device) or a metrology target, or a portion thereof (e.g., a grating of the metrology target), that is used to measure a parameter (e.g., overlay, focus, dose, etc.) of the patterning process. In an embodiment, the metrology target is a diffractive grating used to measure, e.g., overlay.

FIG. 14 schematically illustrates a further embodiment of an inspection apparatus. The system is used to inspect a sample 90 (such as a substrate) on a sample stage 88 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 88. In an embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In an embodiment, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

In an embodiment, a monitoring module 87 is coupled to the image forming module 86 of the image forming apparatus to monitor, control, etc. the patterning process and/or derive a parameter for patterning process design, control, monitoring, etc. using the scanned image of the sample 90 received from image forming module 86. So, in an embodiment, the monitoring module 87 is configured or programmed to cause execution of a method described herein. In an embodiment, the monitoring module 87 comprises a computing device. In an embodiment, the monitoring module 87 comprises a computer program to provide functionality herein and encoded on a computer readable medium forming, or disposed within, the monitoring module 87.

In an embodiment, like the electron beam inspection tool of FIG. 13 that uses a probe to inspect a substrate, the electron current in the system of FIG. 14 is significantly larger compared to, e.g., a CD SEM such as depicted in FIG. 13, such that the probe spot is large enough so that the inspection speed can be fast. However, the resolution may not be as high as compared to a CD SEM because of the large probe spot. In an embodiment, the above discussed inspection apparatus may be single beam or a multi-beam apparatus without limiting the scope of the present disclosure.

The SEM images, from, e.g., the system of FIG. 13 and/or FIG. 14, may be processed to extract contours that describe the edges of objects, representing device structures, in the image. These contours are then typically quantified via metrics, such as CD, at user-defined cut-lines. Thus, typically, the images of device structures are compared and quantified via metrics, such as an edge-to-edge distance (CD) measured on extracted contours or simple pixel differences between images.

In an embodiment, the one or more procedures of the methods 300, 400, 500 and/or 600 can be implemented as instructions (e.g., program code) in a processor of a computer system (e.g., process 104 of computer system 100). In an embodiment, the procedures may be distributed across a plurality of processors (e.g., parallel computation) to improve computing efficiency. In an embodiment, the computer program product comprising a non-transitory computer readable medium has instructions recorded thereon, the instructions when executed by a computer hardware system implementing the method described herein.

According to present disclosure, the combination and sub-combinations of disclosed elements constitute separate embodiments. For example, a first combination includes determining a deblurring model based on depth data related to design patterns. The sub-combination may include determining a deblurring image using the deblurring model. In another combination, the deblurred images can be employed in an inspection process, determining OPC, or SMO based on model-generated variance data. In another example, the combination includes determining, based on inspection data based on the deblurred images, process adjustments to a lithography process, resist process, or etch process to improve the yield of the patterning process.

FIG. 15 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126.

ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

FIG. 16 schematically depicts an exemplary lithographic projection apparatus in conjunction with the techniques described herein can be utilized. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 16 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 16. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

FIG. 17 schematically depicts another exemplary lithographic projection apparatus LA in conjunction with the techniques described herein can be utilized.

The lithographic projection apparatus LA comprises:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus LA is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 17, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 17, for providing the laser beam exciting the fuel. The resulting plasma emits output radiation, e.g., EUV radiation, which is collected using a radiation collector, disposed in the source collector module. The laser and the source collector module may be separate entities, for example when a $CO_2$ laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

FIG. 18 shows the apparatus LA in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 18.

Collector optic CO, as illustrated in FIG. 18, is depicted as a nested collector with grazing incidence reflectors 253, 254 and 255, just as an example of a collector (or collector mirror). The grazing incidence reflectors 253, 254 and 255 are disposed axially symmetric around the optical axis and a collector optic CO of this type may be used in combination with a discharge produced plasma source, often called a DPP source.

Alternatively, the source collector module SO may be part of an LPP radiation system as shown in FIG. 19. A laser LA is arranged to deposit laser energy into a fuel, such as xenon (Xe), tin (Sn) or lithium (Li), creating the highly ionized plasma 210 with electron temperatures of several $10$'s of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

The embodiments may further be described using the following clauses:

1. A non-transitory computer-readable medium for storing a deblurring model configured to deblur a captured image of a patterned substrate comprising instructions stored therein that, when executed by one or more processors, cause operations comprising:

obtaining, via a simulator using a target pattern from which a pattern on a substrate is derived, a simulated image of the substrate corresponding to the target pattern, the target pattern comprising a first target feature to be formed on a first layer on the substrate, and a second target feature to be formed on a second layer on the substrate, the second layer being located below the first layer on the substrate;

determining, based on depth data associated with multiple layers of the substrate, edge range data for features on the substrate corresponding to the first and second target features of the target pattern, wherein the depth data characterizes blurring of edges of the features on the substrate as a function of a depth of the respective feature from a top layer of the substrate; and adjusting, using the simulated image and the edge range data of the substrate as training data, parameters of a base model to generate the deblurring model, the deblurring model being configured to generate a deblur image of the captured image of the patterned substrate using edge range data associated with the captured image.

2. The medium of clause 1, wherein the target pattern comprises geometric data associated with the first target feature, and the second target feature.

3. The medium of clause 2, wherein the geometric data comprises desired shapes of the first target feature and the second target feature, and target locations of the edges of the first target feature and the second target feature, respectively within the target pattern.

4. The medium of any of preceding clause, wherein the depth data comprises at least one of:

a first depth of the first layer located in a vertically downward direction from the top layer, and a second depth of the second layer located in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

5. The medium of any of preceding clause, wherein the edge range data comprises a range of an edge location on the substrate corresponding to each feature within the target pattern.

6. The medium of any of preceding clause, wherein the determining the edge range data comprises: executing a model configured to compute edge variations of features on the substrate corresponding to each feature of the target pattern.

7. The medium of any of preceding clause, wherein the edge range data is represented as an image of the target pattern supplemented with the edge range data of each feature to be printed on the substrate.

8. The medium of any of preceding clause, wherein the obtaining the simulated image further comprises:

extracting noise from a captured image of a patterned substrate; and adding the noise to the simulated image.

9. The medium of any of preceding clause, wherein the deblurring model is a machine learning model.

10. The medium of any of preceding clause, wherein the deblurring model is a deep convolutional network, and model parameters comprises weights and biases of one or more layers of the deep convolutional network.

11. The medium of any of preceding clause, wherein the deblurring model is a neural network comprising:

a feature vector comprising values indicative of a feature of the target pattern, and an attention vector comprising values that are related to depth associated with the feature to be printed on the substrate, the attention vector being configured to operate with the feature vector.

12. The medium of clause 11, wherein the attention vector comprises:

the values in a range from 0 to 1, or the values 0 or 1.

13. The medium of clause 12, wherein the machine learning model is configured to multiply the attention vector with the feature vector so that an edge of a particular feature of the feature vector is assigned a depth related weight by the attention vector.

14. The medium of clause 13, wherein the first target feature associated with the first layer is multiplied by a higher attention value compared to the attention value multiplied with the second target feature associated with the second layer.

15. The medium of any of preceding clause, wherein the simulator comprises a model is a function of physical characteristics of the substrate on which the target pattern will be printed and generate the simulated image thereby allowing determination of a feature characteristics at each layer of the substrate.

16. The medium of clause 15, wherein the physical characteristic of the substrate comprises at least one of: a material of a particular layer, a thickness of the particular layer, a resist process parameter, or an etch process parameter.

17. The medium of clause 16, wherein the obtaining of the simulated image comprises:

simulating, via a Monte Carlo simulation process, the model to generate the simulated image.

18. The medium of clause 16, wherein the obtaining of the simulated image comprises:

simulating a double Gaussian model configured to generate the simulated image based on the depth data.

19. The medium of any of preceding clause, further comprising:

capturing, via an image capture device, an image of a multi-layered patterned substrate using a given target pattern;

determining an edge range data for features on the substrate corresponding to each feature of the given target pattern;

inputting the edge range data and the captured image to the deblurring model to generate a deblurred image of the captured image.

20. The medium of clause 19, wherein the captured image is a scanning electron beam (SEM) image obtained via a SEM at a high energy setting used for capturing image of the multi-layered patterned substrate.

21. The medium of any of preceding clause, wherein the target pattern is in a form a polygon-based hierarchical data format.

22. The medium of clause 21, wherein the polygon-based data format comprises GDS format.

23. A non-transitory computer-readable medium for deblurring images obtained from scanning electron microscopy (SEM) by using data on depths of layers of a patterned substrate comprising instructions stored therein that, when executed by one or more processors, cause operations comprising:

receiving a captured image of a patterned substrate:

inputting the captured image into a deblurring model, wherein the deblurring model is trained by:

obtaining, via a simulator using a target pattern from which a pattern on a substrate is derived, a simulated image of the substrate corresponding to the target pattern, the target pattern comprising a first target feature to be formed on a first layer on the substrate, and a second target feature to be formed on a second layer on the substrate, the second layer being located below the first layer on the substrate;

determining, based on depth data associated with multiple layers of the substrate, edge range data for features on the substrate corresponding to the first target feature and the second target feature of the target pattern, wherein the depth data characterizes blurring of edges of the features on the substrate as a function of a depth of the respective feature from a top layer of the substrate; and adjusting, using the simulated image and the edge range data of the substrate as training data, parameters of a base model to generate the deblurring model;

receiving an output from the deblurring model using the captured image and edge range data associated features of the patterned substrate; and generating for display, on a user interface, a deblurred version of the captured image.

24. The medium of clause 23, wherein the target pattern comprises geometric data associated with the first target feature, and the second target feature.

25. The medium of clause 24, wherein the geometric data comprises desired shapes of the first target feature and the second target features, and target locations of the edges of the first target feature and the second target feature, respectively within the target pattern.

26. The medium of any of clauses 23-25, wherein the depth data comprises at least one of:

a first depth of the first layer measured in a vertically downward direction from the top layer, and a second depth of the second layer measured in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

27. The medium of any of clauses 23-26, wherein the edge range data comprises a range of an edge location of features on the substrate corresponding to each feature within the target pattern.

28. The medium of any of clauses 23-27, wherein the determining the edge range data comprises:

executing a model configured to compute edge variations of features on the substrate corresponding to each feature of the target pattern.

29. The medium of any of clauses 23-28, wherein the edge range data is represented as an image of the target pattern supplemented with the edge range data of each feature of the target pattern.

30. The medium of any of clauses 23-29, wherein the deblurring model is a machine learning model.

31. The medium of any of clauses 23-30, wherein the deblurring model is a deep convolutional network, and model parameters comprises weights and biases of one or more layers of the deep convolutional network.

32. The medium of any of clauses 23-31, wherein the simulator comprises a model is a function of physical characteristics of the substrate on which the target pattern will be printed and generate the simulated image thereby allowing determination of a feature characteristics at each layer of the substrate.

33. The medium of any of clauses 23-32, wherein the captured image is a scanning electron beam (SEM) image obtained via a SEM at a high energy setting used for capturing image of the multi-layered patterned substrate.

34. A non-transitory computer-readable medium for debluring a captured image of a patterned substrate comprising instructions stored therein that, when executed by one or more processors, cause operations comprising:

inputting the captured image of the patterned substrate and edge range data associated with a target pattern to a deblurring model, wherein the deblurring model is trained based on edge range data associated with features of the target pattern at certain depth; and deblurring the captured image by executing the deblurring model.

35. The medium of clause 34, wherein the edge range data for features on the substrate corresponding to the features of the target pattern is determined based on depth data associated with the target pattern and the substrate.

36. The medium of clause 35, wherein the depth data comprises at least one of:

a first depth of a first layer measured in a vertically downward direction from a top layer, and a second depth of the second layer measured in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

37. The medium of any of clauses 34-36, wherein the edge range data comprises a range of an edge location for features on the substrate corresponding to each feature within the target pattern.

38. The medium of clause 34, wherein the determining the edge range data comprises:

executing a model configured to compute edge variations of features on the substrate corresponding to each feature of the target pattern.

39. The medium of any of clauses 34-38, wherein the edge range data is represented as an image of the target pattern supplemented with the edge range data corresponding to each feature of the target pattern.

40. A method of deblurring a captured image of a pattered substrate, the method comprising:

identifying features in the captured image based on a target pattern and depth data associated with multiple layers of the patterned substrate; and deblurring the captured image by deblurring each of the features based on the target pattern and the depth data.

41. The method of clause 40, wherein the depth data comprises at least one of:

a first depth of a first layer from a top layer of the patterned substrate, and a second depth of a second layer from the top layer;

material data of the first layer and the second layer of the patterned substrate; or diffraction behavior associated with a first feature and a second feature on the substrate corresponding to the first target feature and the second target feature of the target pattern, respectively.

42. The method of clause 41, wherein the identifying features in the captured image comprises:

determining an edge range data for features on the patterned substrate based on the depth data associated with multiple layers of the patterned substrate.

43. The method of clause 42, wherein the edge range data comprises a range of an edge location of the features on the substrate corresponding to each feature within the target pattern.

44. The method of clause 43, wherein the determining the edge range data comprises:

executing a model configured to compute edge variations of features on the substrate corresponding to each feature of the target pattern.

45. The method of any of clauses 42-44, wherein the edge range data is represented as an image of the target pattern supplemented with the edge range data corresponding to each feature of the target pattern.

46. A method for generating a deblurring model to deblur a captured image of a patterned substrate, the method comprising:

obtaining, via a simulator using a target pattern from which a pattern on a substrate is derived, a simulated image of the substrate corresponding to the target pattern, the target pattern comprising a first target feature to be formed on a first layer on the substrate, and a second target feature to be formed on a second layer on the substrate, the second layer being located below the first layer on the substrate;

determining, based on depth data associated with multiple layers of the substrate, edge range data for features on the substrate corresponding to the first target feature and the second target features of the target pattern, wherein the depth data characterizes blurring of edges of the features on the substrate as a function of a depth of the respective feature from a top layer of the substrate; and adjusting, using the simulated image and the edge range data of the substrate as training data, parameters of a base model to generate a deblurring model, the deblurring model being configured to generate a deblur image of a captured image of a patterned substrate using edge range data associated with the captured image.

47. The method of clause 46, wherein the target pattern comprises geometric data associated with the first target feature, and the second target feature.

48. The method of clause 47, wherein the geometric data comprises desired shapes of the first target feature and the second target feature, and target locations of the edges of the first target feature and the second target feature, respectively within the target pattern.

49. The method of any of clause 46-48, wherein the depth data comprises at least one of:

a first depth of the first layer located in a vertically downward direction from the top layer, and a second depth of the second layer located in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

50. The method of any of clauses 46-49, wherein the edge range data comprises a range of an edge location for features on the substrate corresponding to each feature within the target pattern.

51. The method of any of clauses 46-50, wherein the determining the edge range data comprises:

executing a model configured to compute edge variations of features on the substrate corresponding to each feature of the target pattern.

52. The method of any of clauses 46-51, wherein the edge range data is represented as an image of the target pattern supplemented with the edge range data corresponding to each feature of the target pattern.

53. The method of any of clause 46-52, wherein the obtaining the simulated image further comprises:

extracting noise from a captured image of a patterned substrate; and adding the noise to the simulated image.

54. The method of any of clauses 46-53, wherein the deblurring model is a machine learning model.

55. The method of any of clauses 46-54, wherein the deblurring model is a deep convolutional network, and model parameters comprises weights and biases of one or more layers of the deep convolutional network.

56. The method of any of clauses 46-55, wherein the deblurring model is a neural network comprising:

a feature vector comprising values indicative of a feature of the target pattern, and an attention vector comprising values that are related to depth associated with the feature to be printed on the substrate, the attention vector being configured to operate with the feature vector.

57. The method of clause 56, wherein the attention vector comprises:

the values in a range from 0 to 1, or the values 0 or 1.

58. The method of clause 57, wherein the machine learning model is configured to multiply the attention vector with the feature vector so that an edge of a particular feature of the feature vector is assigned a depth related weight by the attention vector.

59. The method of clause 58, wherein the first target feature associated with the first layer of the substrate is multiplied by a higher attention value compared to the attention value multiplied with the second target feature associated with the second layer of the substrate.

60. The method of any of clauses 46-59, wherein the simulator comprises a model is a function of physical characteristics of the substrate on which the target pattern will be printed and generate the simulated image thereby allowing determination of a feature characteristics at each layer of the substrate.

61. The method of clause 60, wherein the physical characteristic of the substrate comprises at least one of: a material of a particular layer, a thickness of the particular layer, a resist process parameter, or an etch process parameter.

62. The method of clause 61, wherein the obtaining of the simulated image comprises:

simulating, via a Monte Carlo simulation process, the model to generate the simulated image.

63. The method of clause 62, wherein the obtaining of the simulated image comprises:

simulating a double Gaussian model configured to generate the simulated image based on the depth data.

64. The method of any of clauses 46-63, further comprising:

capturing, via an image capture device, an image of a multi-layered patterned substrate using a given target pattern;

determining an edge range data for features on the substrate corresponding to each feature of the given target pattern;

inputting the edge range data and the captured image to the deblurring model to generate a deblurred image of the captured image.

65. The method of clause 64, wherein the captured image is a scanning electron beam (SEM) image obtained via a SEM at a high energy setting used for capturing image of the multi-layered patterned substrate.

66. The method of any of clauses 46-65, wherein the target pattern is in a form a polygon-based hierarchical data format.

67. The method of clause 66, wherein the polygon-based data format comprises GDS format.

68. A method of deblurring a captured image of a patterned substrate, the method comprising:

inputting a captured image of the patterned substrate and edge range data associated with a target pattern to a deblurring model, wherein the deblurring model is trained based on edge range data associated with features of the target pattern at certain depth; and deblurring the captured image by executing the deblurring model.

69. The method of clause 68, wherein the edge range data for features on the patterned substrate corresponding to the features of the target pattern is determined based on depth data associated with the target pattern and the substrate.

70. The method of clause 69, wherein the depth data comprises at least one of:

a first depth of a first layer located in a vertically downward direction from a top layer, and a second depth of the second layer located in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

71. The method of any of clauses 68-70, wherein the edge range data comprises a range of an edge location for features on the substrate corresponding to each feature within the target pattern.

72. The method of clause 68, wherein the determining the edge range data comprises:

executing a model configured to compute edge variations of features on the substrate corresponding to each feature of the target pattern.

73. The method of any of clauses 68-72, wherein the edge range data is represented as an image of the target pattern supplemented with the edge range data corresponding to each feature of the target pattern.

74. A system for deblurring a captured image of a patterned substrate, the method comprising:

an electron beam optics configured to capture an image of a patterned substrate patterned based on a target pattern; and and one or more processors configured to input the captured image of the patterned substrate and edge range data associated with the target pattern to a deblurring model, wherein the deblurring model is trained based on edge range data associated with features of the target pattern at certain depth; and deblur the captured image by executing the deblurring model.

75. The system of clause 74, wherein the edge range data for features on the patterned substrate corresponding to the features of the target pattern is determined based on depth data associated with the target pattern and the substrate.

76. The system of clause 75, wherein the depth data comprises at least one of:

a first depth of a first layer located in a vertically downward direction from a top layer, and a second depth of the second layer located in a vertically downward direction from the top layer of the substrate;

material data associated with the first layer and the second layer of the substrate; or diffraction behavior associated with a first feature and a second feature on the substrate corresponding to the first target feature and the second target feature of the target pattern, respectively.

77. The system of any of clauses 74-76, wherein the edge range data comprises a range of an edge location for features on the substrate corresponding to each feature within the target pattern.

78. The system of clause 77, wherein the determining the edge range data comprises:

executing a model configured to compute edge variations of features on the substrate corresponding to each feature of the target pattern.

79. The system of any of clauses 74-78, wherein the edge range data is represented as an image of the target pattern supplemented with the edge range data corresponding to each feature of the target pattern.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

The descriptions above are intended to be illustrative, not limiting. Thus, it will be apparent to one skilled in the art that modifications may be made as described without departing from the scope of the claims set out below.

The invention claimed is:

1. A non-transitory computer-readable medium for storing a deblurring model configured to deblur a captured image of a patterned substrate comprising instructions stored therein that, when executed by one or more processors, cause operations comprising:

obtaining, via a simulator using a target pattern from which a pattern on a substrate is derived, a simulated image of the substrate corresponding to the target pattern, the target pattern comprising a first target feature to be formed on a first layer on the substrate, and a second target feature to be formed on a second layer on the substrate, the second layer being located below the first layer on the substrate;

determining, based on depth data associated with multiple layers of the substrate, edge range data for features on the substrate corresponding to the first and second target features of the target pattern, wherein the depth data characterizes blurring of edges of the features on the substrate as a function of a depth of the respective feature from a top layer of the substrate; and adjusting, using the simulated image and the edge range data of the substrate as training data, parameters of a base model to generate the deblurring model, the deblurring model being configured to generate a deblur image of the captured image of the patterned substrate using edge range data associated with the captured image.

2. The medium of claim 1, wherein the target pattern comprises geometric data associated with the first target feature, and the second target feature.

3. The medium of claim 2, wherein the geometric data comprises desired shapes of the first target feature and the second target feature, and target locations of the edges of the first target feature and the second target feature, respectively within the target pattern.

4. The medium of claim 1, wherein the depth data comprises at least one of:
    a first depth of the first layer located in a vertically downward direction from the top layer, and a second depth of the second layer located in a vertically downward direction from the top layer of the substrate;
    material data associated with the first layer and the second layer of the substrate; or
    diffraction behavior associated with a first feature and a second feature on the substrate corresponding to the first target feature and the second target feature of the target pattern, respectively.

5. The medium of claim 1, wherein the edge range data comprises a range of an edge location on the substrate corresponding to each feature within the target pattern.

6. The medium of claim 1, wherein the determining the edge range data comprises:
    executing a model configured to compute edge variations of features on the substrate corresponding to each feature of the target pattern.

7. The medium of claim 1, wherein the edge range data is represented as an image of the target pattern supplemented with the edge range data of each feature to be printed on the substrate.

8. The medium of claim 1, wherein the obtaining the simulated image further comprises:
    extracting noise from a captured image of a patterned substrate; and
    adding the noise to the simulated image.

9. The medium of claim 1, wherein the deblurring model is a machine learning model.

10. The medium of claim 1, wherein the deblurring model is a deep convolutional network, and model parameters comprises weights and biases of one or more layers of the deep convolutional network.

11. The medium of claim 1, wherein the deblurring model is a neural network comprising:
    a feature vector comprising values indicative of a feature of the target pattern, and
    an attention vector comprising values that are related to depth associated with the feature to be printed on the substrate, the attention vector being configured to operate with the feature vector.

12. The medium of claim 11, wherein the attention vector comprises:
    the values in a range from 0 to 1, or
    the values 0 or 1.

13. The medium of claim 12, wherein the machine learning deblurring model is configured to multiply the attention vector with the feature vector so that an edge of a particular feature of the feature vector is assigned a depth related weight by the attention vector.

14. The medium of claim 13, wherein the first target feature associated with the first layer is multiplied by a higher attention value compared to the attention value multiplied with the second target feature associated with the second layer.

15. A method of deblurring a captured image of a patterned substrate, the method comprising:
    identifying features in the captured image based on a target pattern and depth data associated with multiple layers of the patterned substrate; and
    deblurring, by executing a deblurring model, the captured image by deblurring each of the features based on the target pattern and the depth data,
        wherein the deblurring model is configured to receive the captured image of the patterned substrate and edge range data associated with the target pattern, and the deblurring model is trained based on edge range data associated with features of the target pattern at a certain depth.

16. A non-transitory computer-readable medium for deblurring a captured image of a patterned substrate comprising instructions stored therein that, when executed by one or more processors, cause operations comprising:
    inputting the captured image of the patterned substrate and edge range data associated with a target pattern to a deblurring model, wherein the deblurring model is trained based on edge range data associated with features of the target pattern at certain depth; and
    deblurring the captured image by executing the deblurring model.

17. The medium of claim 16, wherein the edge range data for features on the substrate corresponding to the features of the target pattern is determined based on depth data associated with the target pattern and the substrate.

18. The medium of claim 17, wherein the depth data comprises at least one of:
    a first depth of a first layer measured in a vertically downward direction from a top layer, and a second depth of the second layer measured in a vertically downward direction from the top layer of the substrate;
    material data associated with the first layer and the second layer of the substrate; or
    diffraction behavior associated with a first feature and a second feature on the substrate corresponding to a first target feature and a second target feature of the target pattern, respectively.

19. The medium of any of claim 16, wherein the edge range data comprises a range of an edge location for features on the substrate corresponding to each feature within the target pattern.

20. The medium of claim 17, wherein determining the edge range data comprises:
    executing a model configured to compute edge variations of features on the substrate corresponding to each feature of the target pattern.

* * * * *